Feb. 26, 1952 E. L. SCHMIDT 2,587,532

SYSTEM FOR MAGNETIC STORAGE OF DATA

Filed May 5, 1948 8 Sheets-Sheet 1

INVENTOR.
EDWIN L. SCHMIDT

BY

V F Presson
ATTORNEY

Feb. 26, 1952 E. L. SCHMIDT 2,587,532

SYSTEM FOR MAGNETIC STORAGE OF DATA

Filed May 5, 1948 8 Sheets-Sheet 2

*INVENTOR.*
EDWIN L. SCHMIDT

*BY* [signature]
ATTORNEY

Feb. 26, 1952 E. L. SCHMIDT 2,587,532

SYSTEM FOR MAGNETIC STORAGE OF DATA

Filed May 5, 1948 8 Sheets-Sheet 3

INVENTOR.
EDWIN L. SCHMIDT
BY
[signature]
ATTORNEY

INVENTOR.
EDWIN L. SCHMIDT
BY
[signature]
ATTORNEY

SYSTEM FOR MAGNETIC STORAGE OF DATA

INVENTOR.
EDWIN L. SCHMIDT
BY
ATTORNEY

Feb. 26, 1952 E. L. SCHMIDT 2,587,532

SYSTEM FOR MAGNETIC STORAGE OF DATA

Filed May 5, 1948 8 Sheets-Sheet 6

INVENTOR.
EDWIN L. SCHMIDT
BY
[signature]
ATTORNEY

Feb. 26, 1952 E. L. SCHMIDT 2,587,532

SYSTEM FOR MAGNETIC STORAGE OF DATA

Filed May 5, 1948 8 Sheets-Sheet 7

INVENTOR.
EDWIN L. SCHMIDT
BY
[signature]
ATTORNEY

INVENTOR.
EDWIN L. SCHMIDT
BY
[signature]
ATTORNEY

Patented Feb. 26, 1952 | 2,587,532

UNITED STATES PATENT OFFICE 2,587,532

SYSTEM FOR MAGNETIC STORAGE OF DATA

Edwin L. Schmidt, Croton-on-Hudson, N. Y., assignor to The Teleregister Corporation, New York, N. Y., a corporation of Delaware Application May 5, 1948, Serial No. 25,285

18 Claims. (Cl. 177—353)

Figure 1:
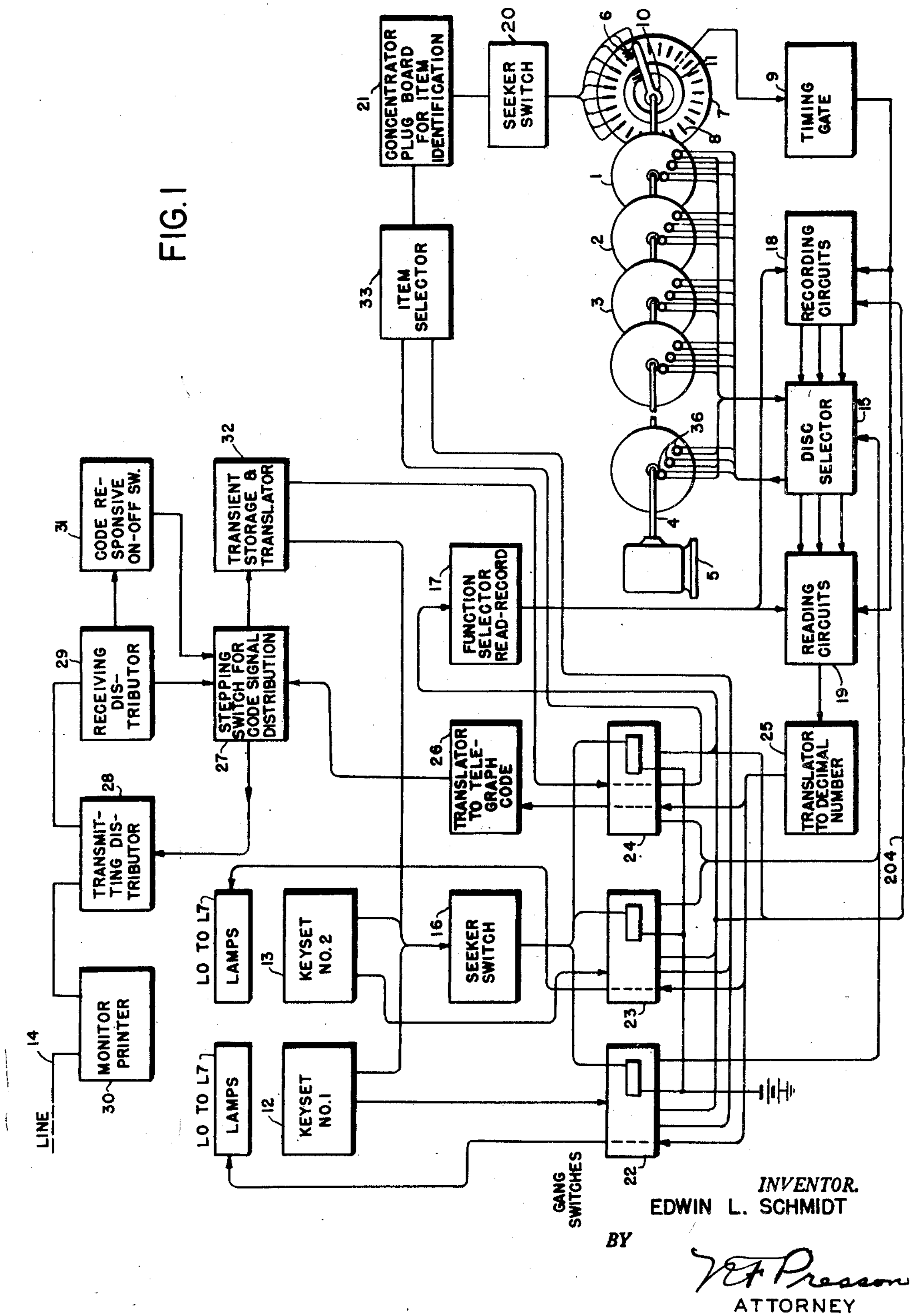

This invention relates to signal transmission and storage systems. The improvements included in my invention facilitate the handling of statistical data by storing the effects of received signals in different storage units according to a predetermined classification. The storage equipment is arranged and adapted to supply information as wanted, and to deliver to a signal transmitting system a message corresponding with what is currently stored in a selected storage unit.

The data storage system which I preferably employ is of a type having a continuously rotatable magnetic recording medium. Recording and reading heads are suitably disposed in relation to the surface of the recording medium so that statistical items may be introduced and afterwards sensed according to whatever requirements the equipment is designed to meet.

In combination with the magnetic recording medium I have arranged to utilize synchronizing means and selecting means whereby a suitable point along a recording track may be chosen for introducing a new item, and whereby any individual point along the recording track may be selected for "reading" the stored item individually. Thus the order in which different items are introduced from time to time bears no consistent relation to the recording points, and the order in which the items are afterwards read is determined only by the utilization needs of the system. The selector means which I employ is used in connection with the synchronizer for determining the instant when a given part of the recording track comes under the recording head or the reading head.

It is an object of my invention to provide a novel system for storing and revealing statistical items according to any desired classification of such items.

A second object is to provide signal storage facilities for such purposes as the maintenance of an inventory account.

A third object is to provide equipment for registering requests for reservations of seats, berths, and the like on board airplanes or other conveyances.

A fourth object is to provide equipment for registering assignments of landing times for different flights of air transport planes at different airports. In carrying out this object I intend to meet the requirements of a proposed flight scheduling procedure wherein the pilot of each plane must request and obtain a "clearance-to-land" order before he takes off from his departure point. Thus if a centrailzed data storage system is provided according to my invention, each request message can be referred to a particular point on the recording medium which corresponds with the time and place of intended landing. In case no reservation had been previously allotted to another plane for the same time at the same airport then a new reservation would be made. Otherwise the request would have to be denied and either a different time or a different airport would have to be chosen by a renewed request.

A fifth object of my invention is to improve upon heretofore known systems for the transmission and storage of statistical data by the use of point-to-point communications facilities in combination with a centralized magnetic recording system which can be controlled either locally or remotely to store and to reveal any item as desired.

A sixth object is to provide improvements in a system of the class described, such improvements referring particularly to the use of electronic devices, relays and other switching mechanism whereby a magnetic storage device may be conveniently controlled with the least possible expenditure of time for the use of the signal transmission facilities.

A seventh object is to provide a magnetic recording medium in combination with control equipment, whereby items of numerical significance may be stored in code form and, when subsequently read out, may be automatically translated into decimally expresed numbers. The code used for recording may be the same as any of the well-known teleprinter codes, or else the binary permutation code may be adopted. Certain modifications of the straight binary code are also known which lend themselves to the simplifying of the electronic or relay circuits. Such modifications may be chosen to meet particular requirements.

An eighth object is to provide means for responding to signals in such a way as to record effect at any point along the recording track of a magnetic recording medium and means for reading such a record item by item in any selected order, regardless of the lineal order in which the items are arranged on the record path.

Figure 8:
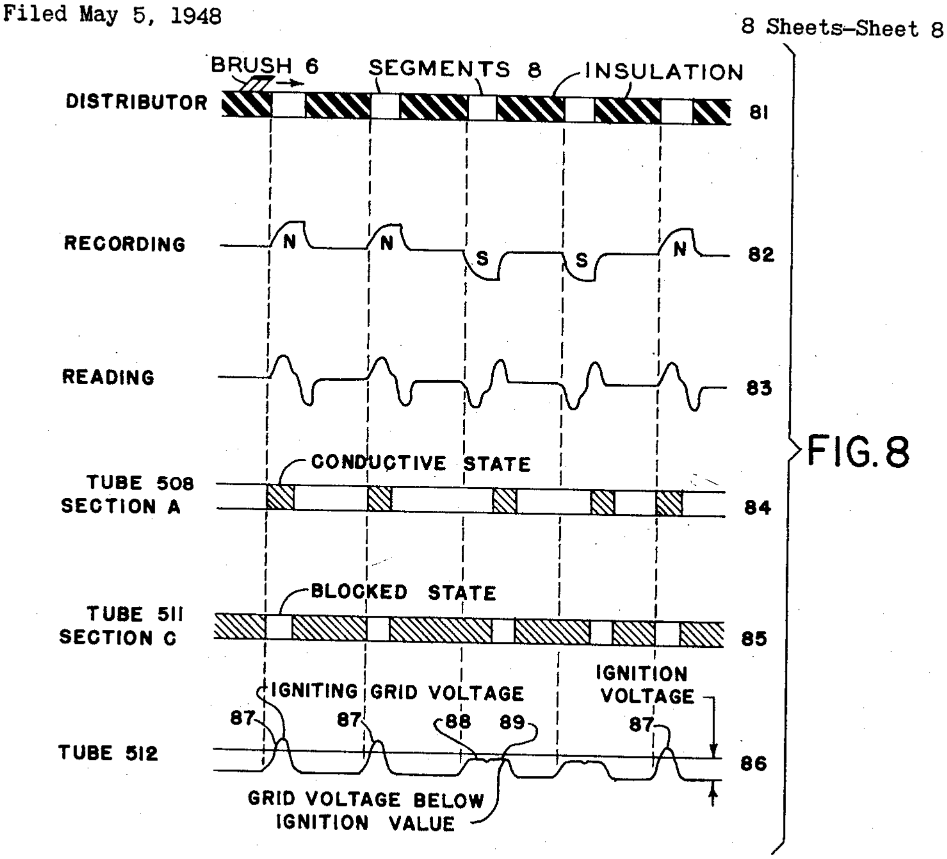
Figure 9:
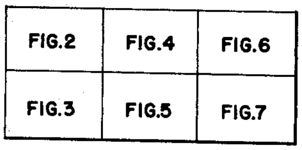
Figure 10:
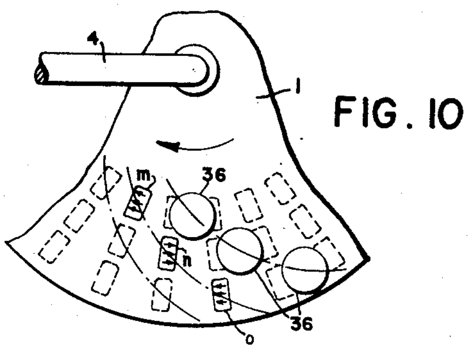

The foregoing and other objects and advantages of my invention will be best understood in view of the following detailed description, taken in connection with the accompanying drawings, in which:

Figure 1 is a diagram showing schematically the basic components of my improved system for magnetic storage of data, and how these components are interconnected and arranged to cooperate;

Figs. 2 to 7 inclusive comprehend a unified circuit diagram of a preferred embodiment of my system;

Fig. 8 shows a graphic chart which is referred to in explaining the timing of different functions as carried out in the operation of my system;

Fig. 9 shows diagrammatically how Figs. 2 to 7 inclusive should be joined together in order to trace certain circuits which extend from one to another of the several figures, and Fig. 10 is a fragmentary view of one of the magnetic storage members of the system, showing the location of individual rows of simulated spots of magnetization, each such row representing a single item of stored information.

In order to clarify the more detailed description which forms a part of this specification, I will first outline the principal components of one typical embodiment of my invention. This form of the invention is well adapted to maintain an inventory of available seats or berths on board different air transport planes or other conveyances. With minor modifications, this same embodiment is also adapted to the storage and display of information concerning flight schedules and the reservation of landing times at airports, especially where there is apt to be considerable congestion of inbound and outbound traffic. Other uses of the system may also suggest themselves to those skilled in the art.

In Fig. 1 there is shown a magnetic storage member comprising a plurality of discs, 1, 2, 3, etc. mounted on a common shaft 4, and arranged for continuous rotation, as by means of a motor 5. Also mounted on the shaft 4 is a brush arm which carries a brush 6. A stationary face plate 7 contains evenly spaced conductive segments 8, sufficient in number to be effective in selecting a large number of different storage positions on the discs for storing statistical items according to their classification.

The method of selecting a particular disc and a particular position around any one of the discs for recording a new item, or for reading a previously recorded item involves the use of selecting relays in the common equipment subject to control from any one of the keysets by which the common equipment is seized. The common equipment may also be seized for the same purposes, if otherwise idle, and controlled from a transient signal storage and translator device 32 in which telegraph code signals received over a line 14 are stored until they can be utilized by the disc selector 15 and the item selector 33.

Figure 4:
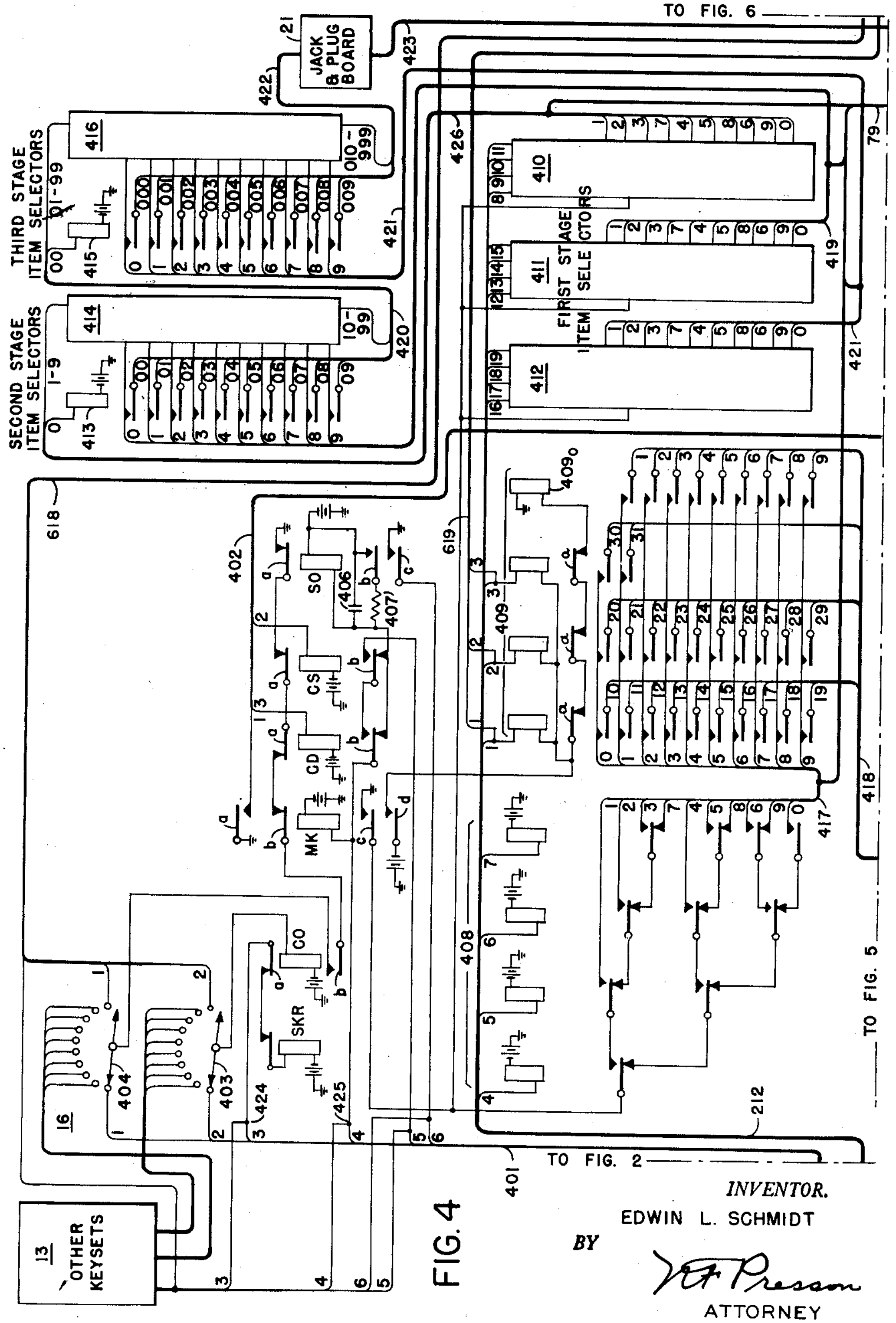
Figure 5:
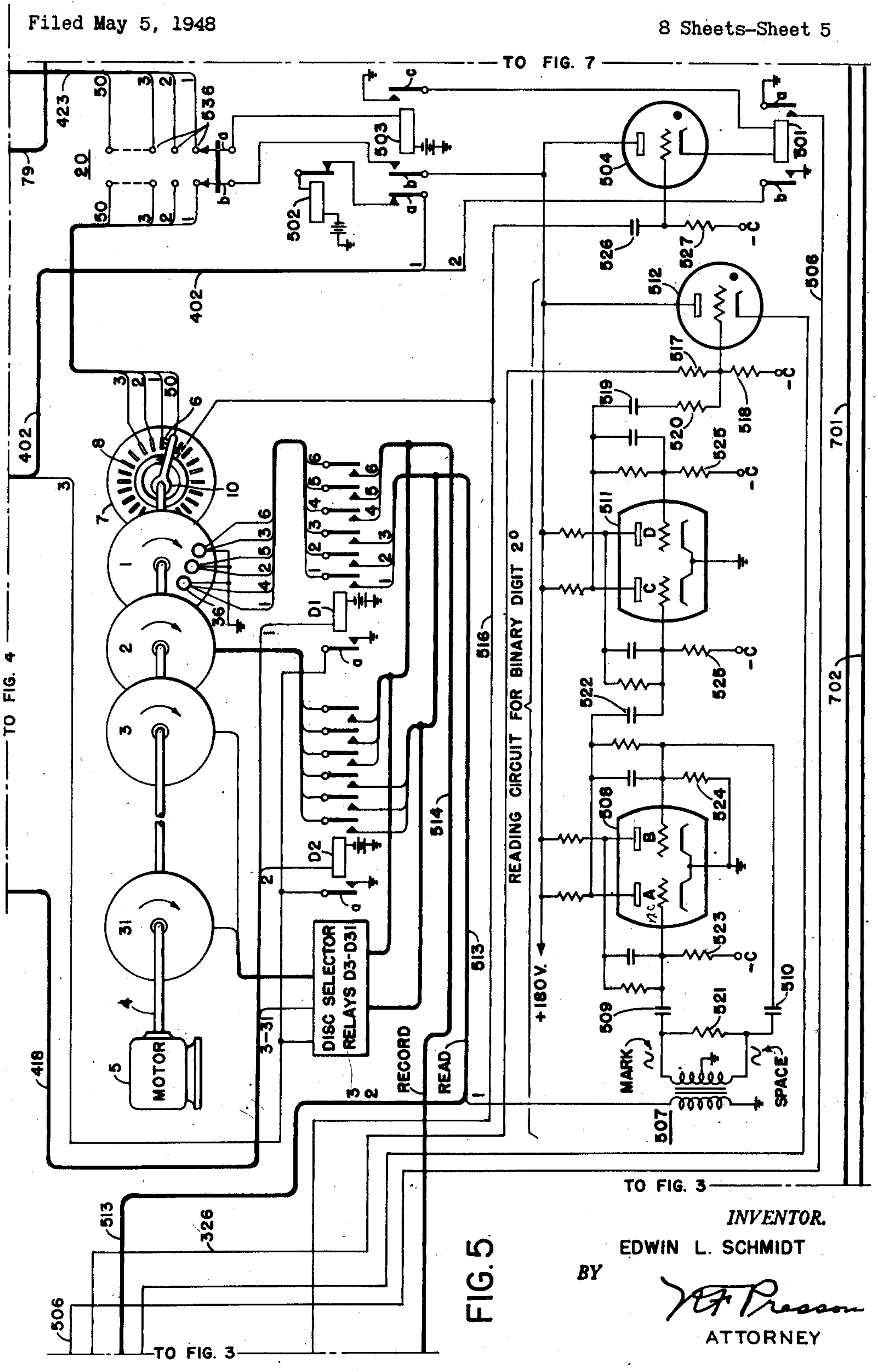

Relays for disc selection are collectively represented by block 15 in Fig. 1. They include relays 408 and 409 in Fig. 4, also relays D1 to D31 inclusive in Fig. 5. These relays shown in Fig. 5 are individually selected by permutational operation of said relays in Fig. 4. The function of these relays is to establish connections through a group of recording and reading heads which are associated with a single disc in accordance with the operation of the date keys of a controlling keyset.

Any desired position around any one of the discs may be chosen for reading or for recording a single item, keys of an operated keyset being depressed in the group labelled Key-Strips for Item Selection. If item numbers from 1 to 999 are chosen at random, but assuming that many of the numbers would be currently inactive, then the use of three strips H, T and U would provide a considerable flexibility of flight number assignments, for example, and would facilitate the adoption of new flight number schedules from time to time. In practical applications the currently used numbers might be no more than fifty, although the apparatus may be so designed as to accommodate a much larger number of recording positions around each disc.

The item selector unit 33 (Fig. 1) represents collectively a large number of selecting relays and stage-by-stage circuit branches leading to 999 jacks in a plug board 21. In Fig. 4 the general arrangement of these relays and the circuits they control is shown to include relays 410, 411 and 412 of a first selector group directly operable from an operated keyset, also relays 413 and 414 of a second selector group and relays 415 and 416 of a third selector group.

In Fig. 1 I have shown only three recording and reading heads suitably disposed with respect to any particular disc for recording a code signal thereon, or for reading such a signal. For the storage of numerical items any number from 1 through 7 can be represented by a 3-element code. In order to record larger numbers, additional heads would be required. For economy of recording spots, numbers expressed in the radix 10 are preferably translated into the binary system, radix 2. Fig. 10 is a fragmentary view of one of the magnetic discs, for example, disc 1 of either Fig. 1 or Fig. 5, showing the relative locations of several rows of simulated spots of magnetization for the permutation code signals of several different items of information. The code is formed by permuted spots of north and south polarity, respectively, relative to the direction of rotation of the disc, the north and south polarities being indicated by arrows pointing in different directions. The row of simulated spots *m*, *n* and *o* shown in full line in the figure and disposed along the curved dot-and-dash line represents the permutation code of a single item of information. Adjacent rows of these magnetized spots representing other individual items of information are indicated in dotted outline. The recording and reading heads 36 also are shown in their relative positions, and while the overall diameter of these heads is greater than the distance between the magnetized spots of adjacent rows, it will be appreciated that the pole pieces of the heads are quite small in area, and this also applies to the magnetized spots, so that there is no overlapping of adjacent spots by the pole pieces of the heads 36 during reading or recording operations. The number of simultaneously-recorded permuted spots in any row representing an item of information, and the number of heads 36 cooperating therewith, will depend upon the number of elements in the binary code employed which in turn will be dictated by the largest number that may have to be stored at any time in regard to any of the items of information.

The recording and reading heads 36 may, if desired, be designed to comprise each a common magnetic core, having separate windings for recording and reading functions, respectively. In certain embodiments of my invention, however, it is found to be of advantage to employ recording heads the windings and cores of which are entirely independent of the reading heads. In these embodiments there is this difference of structure and of operation—namely, that the reading heads must be activated out of phase with the recording heads, and it will be apparent that the phase displacement must be maintained constant as between the gating of pulses into the recording heads and the read-out of signals by the reading heads. In any case the function of the heads when used for recording a statistical item is to apply spot magnetization along selected circular tracks and in different positions which are determined by the operation of the timing gate 9. And, furthermore, the function of the heads when used for reading any item already stored is to pick up by magnetic induction such current pulses as would result from the gating of these heads at a particular moment corresponding to the passage of selected spots of magnetization into reading positions.

The keysets 12 and 13 are typical of any number of keysets which may be required for exercising control from differently situated stations. Thus, for making reservations, each keyset may be located in relatively close proximity to the common equipment and each within easy reach of one or more ticket agents. The common equipment is used to store and to manifest different items of information. My invention may also be operated from a remote point, as by means of a telegraph line 14 or other communications channel.

Since control of the common equipment may be seized by any one of a number of different keysets or teleprinter channels, it is necessary to provide lock-out means for preventing a conflict of control by two different operators, both seeking to record or to read information at the same time. Therefore, as a simple solution to this problem, I preferably resort to techniques which are similar to those used in the automatic telephone switching art. That is, I normally maintain the common equipment disconnected from all control points and, on demand, I establish the necessary connections to the first keyset or other control station seeking to seize control. When control has been seized, it is only necessary to hold the established connections for two or three seconds, more or less, since an answer to any inquiry may be transferred to self-locking indicator lamp circuits associated with each keyset, within the time interval required for one revolution of the magnetic recording member. Then the common equipment becomes released automatically, and can be seized again from the same or any other control station.

The seizure and lock-out functions as above described are performed by means of a seeker switch 16 which operates in response to the manipulation of one or the other of two start keys that are provided on each keyset. One such key 201 serves to record a new item as set up by previously manipulated keys of the keyset. The other start key 202 is used to interrogate the storage member at any selected point for manifesting what information is stored thereat. In the first case, a function selector unit 17 operates to condition certain recording circuits which are included in the block 18. In the second case, unit 17 operates to condition the reading circuits which are included in the block 19.

A more detailed description of the reading and recording circuits will be given hereinafter. In general, however, these circuits are of the electronic type. The discs and the distributor brush arm are mounted on a common shaft 4 and their mutual phase relation is, therefore, fixed. So, the application of a control potential to a selected segment 8 on the faceplate 7 determines the recording or reading position for any given item.

It will be apparent from the foregoing description that the date keys are to be used for selecting an individual disc, either for reading or for recording an item. Furthermore, the item selection keys are useful for timing the reading or recording function so as to coincide with a selected point around any one of the discs. The item selector 33 and the timing gate 9 are thus controlled for carrying out this function.

For the purpose of storing numerical items, each keyset is provided with keys 203 like those on an adding machine. For economy of storage space it is preferable to translate digital numbers into binary numbers. The key contacts of key strip 203 are arranged to do this. Their circuits control certain relays 320, 321 and 322 in the unit 18, these circuits being carried through cable 204.

When it is desired to interrogate the storage device as to the number recorded at any point on any selected disc, the operation of one of the keysets provides the preliminary setup of conditions both for disc selection and for item selection in the same manner as for making a new record. In this case, however, a start key 202 is manipulated for taking a reading. This causes a function selector unit 17 to condition the reading circuits 19 so as to feed pulses from the heads 36 through the reading circuits of the unit 19 and thence to a translator 25. Binary number codes as fed to the translator unit are converted into decimal numbers, where, for a given digital order, a single output circuit is energized.

In order to avoid undue complexity of the circuit diagram I have restricted the range of numerical values to be dealt with in recording, reading, translating and indicating. Thus when using a 3-place binary code, no number higher than 7 can be represented. It is well known, however, that binary numbers expressed in any number of digits are capable of translation into equivalent numbers of the decimal system, and vice versa, and physical means are known for effecting the translation automatically.

Figure 2:
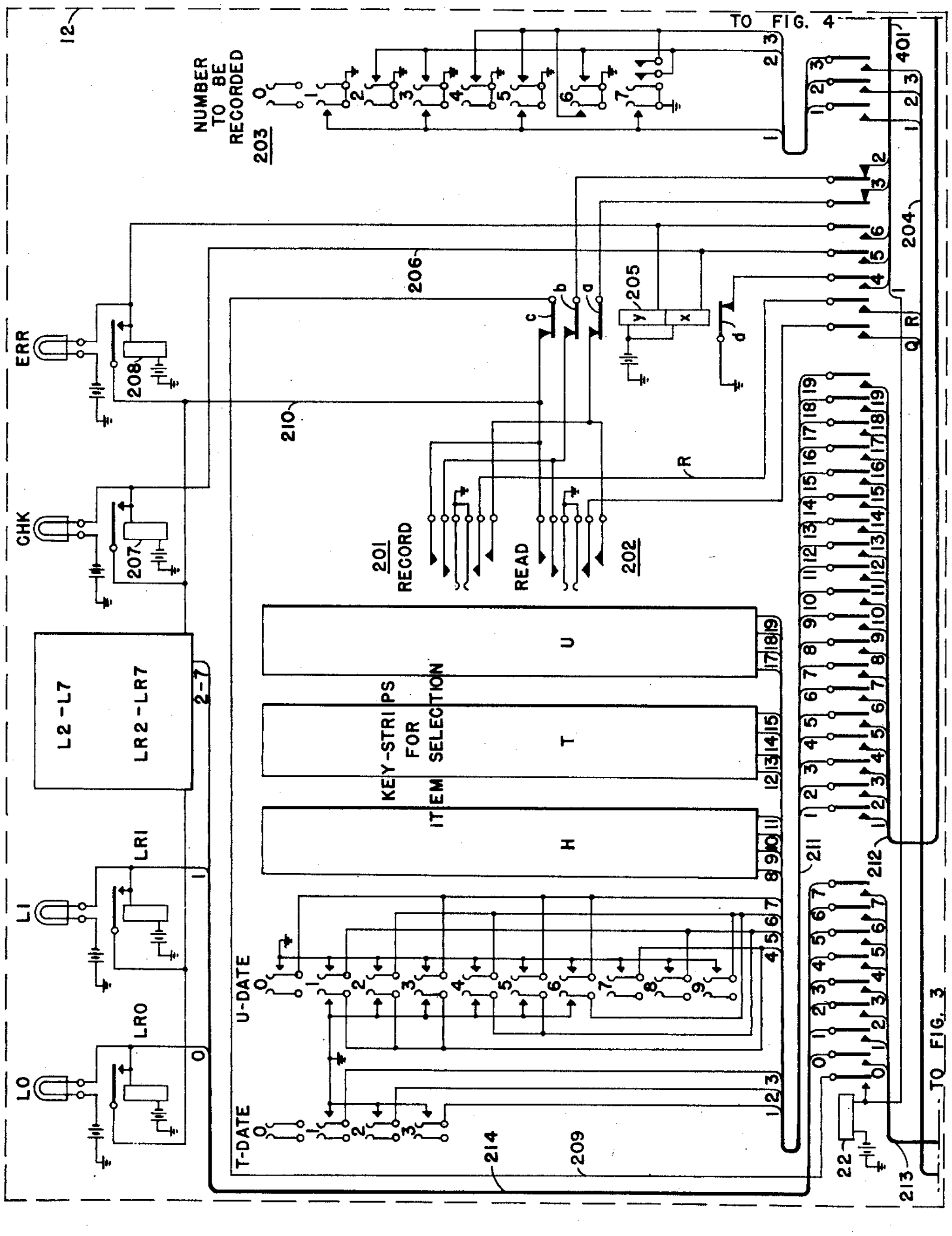

Associated with each keyset is a lamp bank having eight lamps L0 to L7 inclusive for indicating the numerical value of what is read-out from the magnetic storage unit at any selected point of any selected disc. Additionally, as shown in Fig. 2, I preferably employ two more lamps which are labeled respectively CHK and ERR. Lamp CHK lights up either upon making a new record or while taking a reading, provided the steps of selection were not erroneously taken.

An error of selection results in the lighting of the lamp ERR, thus warning the keyset operator that he should re-set his selecting keys.

The lamp circuits which are outgoing from the translator unit 25 are branched to the several gang switches 22, 23 and 24, and since only one of these switches is closed at any time one lamp in a strip associated with only an operated keyset is lit, or else, in the case of switch 24 being operated, the indication to be remotely made is first translated into a telegraph printer code by means of a translator unit 26.

The stepping switch 27 operates step-by-step, first at the cadence of incoming signals, then at a cadence suited to the transmission of outgoing signals. During the latter part of its operating cycle it picks up the code signal which has been composed in the translator unit 26, provided the storage unit has been interrogated and the reading circuits caused to function. During transmission of outgoing signals over the line 14 the transmitting distributor 28 is controlled by output signals from the stepping switch 27. This operation will, in due course, be explained in more detail.

Fig. 1 as described above will be recognized as nothing more than a schematic outline of the essential components of a system for magnetic storage of classifiable data. In order to fully understand the details of such a system, as well as the cooperation between related parts, I shall now describe the circuit arrangement that is spread over Figs. 2 to 7 inclusive. This circuit arrangement is in conformity with what is shown in Fig. 1 and does not represent an alternative embodiment.

While the detailed description of Figs. 2 to 7 inclusive may include references to certain components as though their utilization might be restricted to a system for recording seat reservations, it should be understood that the embodiment of my invention herein shown and described has a much wider range of usefulness, and that its use as a "Reservisor" is merely referred to by way of illustration.

In Fig. 2 a complete keyset is diagrammatically shown. The entire figure is enclosed in a broken line rectangle 12 to indicate its correspondence with unit 12 in Fig. 1. Other keysets like that of Fig. 2 are indicated by the block 13 in Fig. 4. Two key-strips labelled T-Date and U-Date are used for designating the tens and units figures of a date. Three key-strips H, T and U are labelled as a group Key-Strips for Item Selection. These key-strips are used to designate the hundreds, tens and units digits of an item number, such as a flight number. Only eight keys are shown in strip 203, these being sufficient to illustrate the principle of recording a number in binary code. If the system were to require the use of numbers having two or more digits, it is, of course, feasible to add digital strips each with ten keys, these key strips to be used for codifying any number representing an inventory of seats available. Two operating keys or start keys 201 and 202 are used selectively for actuating the common equipment after setting up a selection in the date and flight number keys. Thus, a new item may be recorded at a selected point on the data storage unit, first by depressing date keys to identify the date, then by depressing a key in each of the ITEM key strips to identify the flight number, next by depressing a key on strip 203 to specify the quantity to be recorded, and finally by operating the lever key 201 to start the selecting and recording operation of the common equipment.

When the storage unit is to be interrogated, so as to read an item that has been recorded thereon, lamps L0 to L7 inclusive are selectively lighted, thereby to indicate the number of seats that are available on any particular day and any particular flight for that day. Two additional lamps CHK and ERR are provided for indicating, in one case, that a recorded item has been properly reached for interrogation, or, in the other case, that it was not reached because of some erroneous manipulation of the keyset; as for example, when a currently unused flight number was designated.

All of the selective circuits which are controlled by the date and flight number key strips and by the key strip 203 are connected to the common equipment through contacts of a connect relay 22. This relay is operated upon netting either the Record key 201 or the Read key 202. These keys function alternatively. They set in motion a seeker switch 16 shown in Fig. 4 and having a stepping magnet SKR which controls two wipers 403 and 404. Each wiper moves over its own bank of contacts. In the contact banks a given segmental contact corresponds to one of the keysets or to a setting at which the common equipment is placed under control of transient storage devices operable remotely through a teleprinter circuit. When the seeker switch 16 has been moved to a position corresponding with an operated keyset, it comes to rest and allows the settings of the key strips to be made effective in locking up certain selective relays as shown in Figs. 4 and 5.

In Fig. 5 I show an item storage device comprising a number of discs 1 to 31 inclusive, each corresponding to a day of the month. These discs are faced with magnetic material. Associated with them are different reading and recording heads 36. Mounted on the same shaft with the discs is a brush arm which carries a brush 6 arranged to sweep over segments 8 for the purpose of actuating a set of reading heads or recording heads 36 at a particular instant when a selected item is rotated into a proper position for making a reading or a recording.

The shaft 4 on which the discs and brush arm are mounted is preferably driven by a motor 5. Selection of one individual segment 8 causes a potential to be fed through suitable circuits for timing the operation of the read-record heads 36. This is a flight number selection which results from the operation of a seeker switch 20.

It will be apparent that when the keyset is provided with three keystrips H, T and U, the range of item selections for flight numbers will include all numbers from 0 to 999. In practice, however, only a few such numbers may be currently used to identify the flights scheduled for each day. So, as a practical matter it is found to be a convenience to use a jack-and-plug board 21 whereby selection of one particular jack in a group of 1000 is determined by the setting of three keys, one in each of the key strips H, T and U. Then for selecting one of a much smaller number of currently used storage positions on the data storage unit, say from 1 to 50 inclusive, a plug and cord connection is preferably made from the currently used jacks of the board 21 to each of that many segments on a bank or banks of the seeker switch 20.

Figure 3:
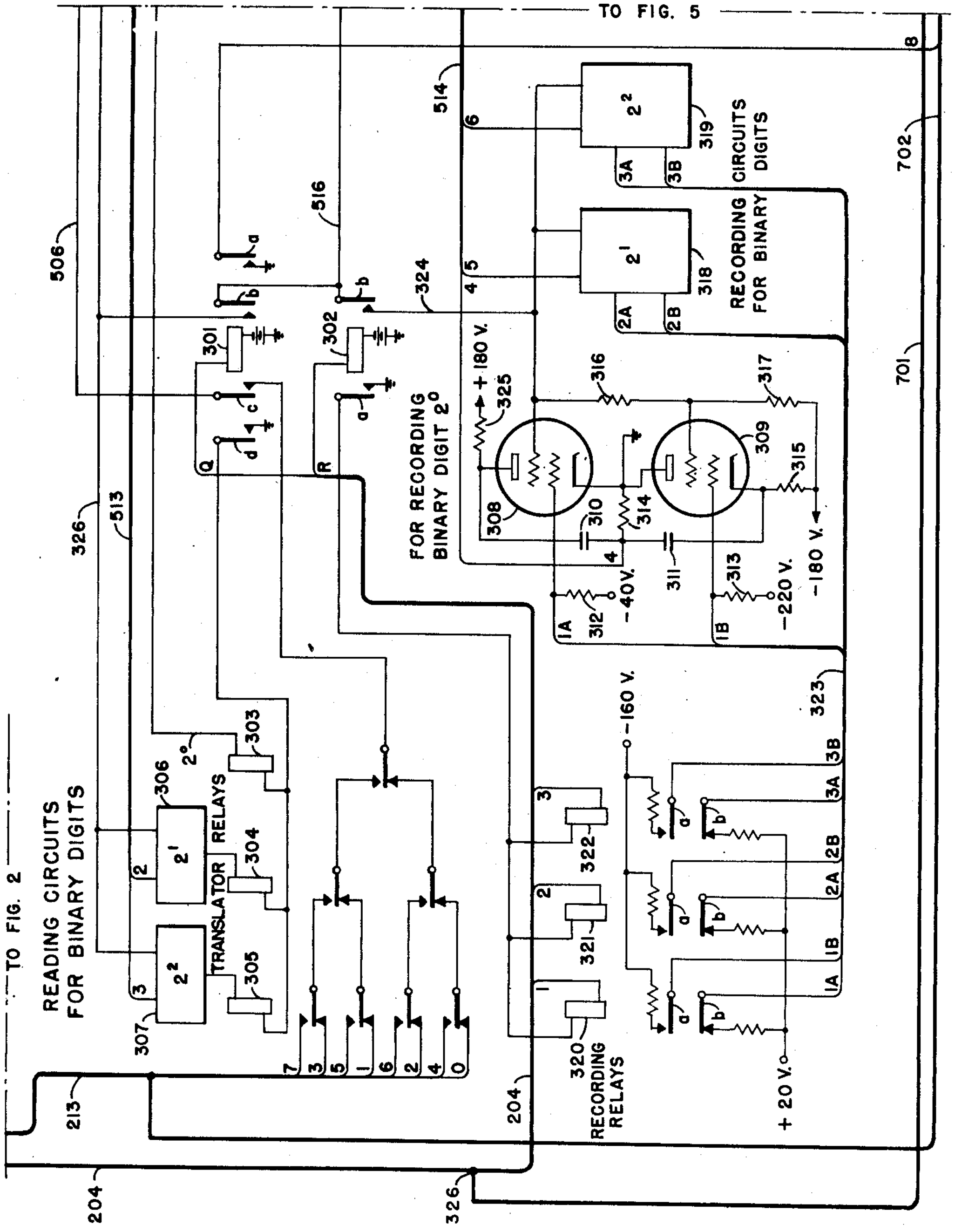

The common equipment includes certain reading circuits which are controlled by an operated keyset through disc selecting relays 408 and 409 and through timing of the operation of the read-record heads, this function being carried out by means of a pulse transmitted through a selected segment 8 on the distributor face plate 7 and through brush 6 as it wipes over that segment. The timing function of the distributor is carried out through an electronic gating circuit in cooperation with an electronic reading circuit arrangement as shown in Fig. 5 for one digit of a binary code labelled $2^0$. Similar electronic reading circuits for binary code digits $2^1$ and $2^2$ are shown in Fig. 3. Each of these electronic circuits is gated at the same instant for reading a magnetically stored item. The effect is to actuate relays 303, 304 and 305 in different combinations, or individually, for translating the binary representation of the stored item into a decimally ordered number. This number is then indicated by closure of an individual circuit through one of the lamps L0 to L7 inclusive, as shown in Fig. 2. Such a reading operation is performed in response to the setting of the lever switch 202, which causes relay 301 to be actuated along with other selecting operations.

For purposes of recording a new item in any selected space around any selected disc the disc and item number selection is performed in the same manner as for interrogating the record. In this case, however, the lever switch 201 is closed, thereby actuating the record relay 302. This relay when operated establishes the necessary conditions for operation of certain recording circuits of the electronic type as shown in Fig. 3. The number to be recorded is determined by depressing one of the keys 203, thereby to actuate permutatively a set of recording relays 320, 321 and 322. The recording process will be more completely described hereinafter.

Figure 6:
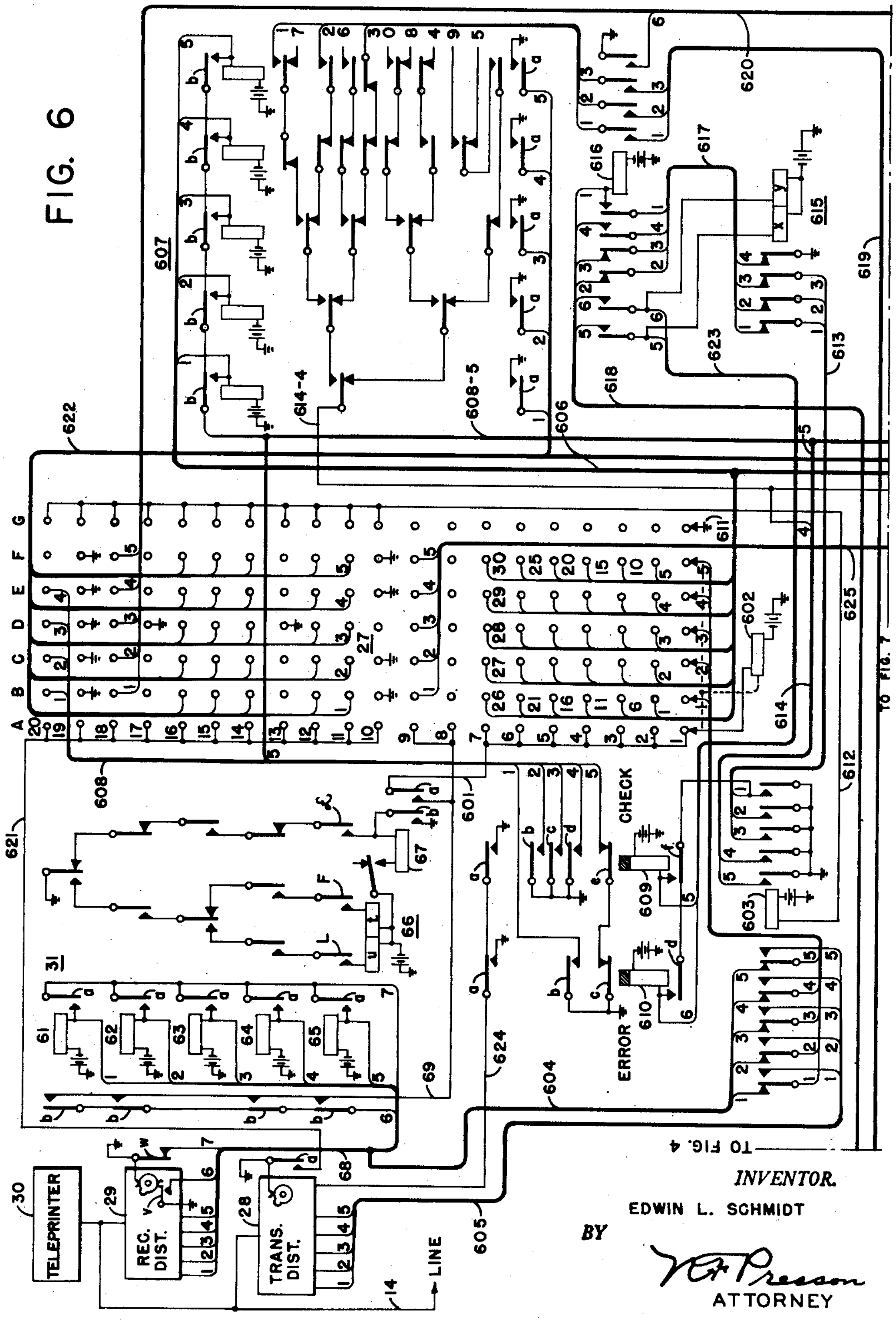

In Fig. 6 I show a teleprinter unit 30 with which is associated a receiving distributor 29 and a transmitting distributor 28. Upon reception of incoming signals which relate to data storage, a code-responsive on-off switch 31 first responds to a special code signal such as to start the operation of a stepping switch 27 which feeds signals to a transient storage device 32. The result is to set up certain relays in groups corresponding to the received code signals. The function of these relays is comparable to that of the keys in a keyset. Thus, a message of interrogation or a message for recording a new item is temporarily stored and is transferred to the common equipment only when the latter is not under control of one of the keysets.

The above description being more or less generalized, it is now in order to describe the circuits in more detail. In operation the storage units must first be setup to record available seating capacity for each flight on each day. Afterwards an operator at any one of the keysets may interrogate the items which are numerically stored on the discs to ascertain the present status of the seating record by causing one lamp in the group L0 to L7 inclusive to be lit. First, however, I will describe the circuits as used for recording a new item.

Three of the keys in the T-Date strip have grounded contacts and contacts individually connected to circuits 1, 2 and 3 in cable 211 which are connected to different contacts of the connect relay 22. In the U-Date strip each key impresses a ground potential on a different combination of circuits 4, 5, 6 and 7, in cable 211. These circuits also include contacts of the connect relay 22. The keys of the item selection strips H, T and U are arranged for codifying their respective numbers in the same permutational arrangement as shown for the U-Date keys. The circuits for item selection include conductors 8 to 19 inclusive in cables 211 and 212. They all feed through the connect-relay 22.

The recording key 201 impresses ground potential on each of its outgoing circuits. One of these circuits R is connected through the connect-relay 22 and through cable 204 to a relay 302. The function selector unit 17 (Fig. 1) will be understood to include relays 301 and 302 (Fig. 3) and these relays are controlled respectively by start keys 202 and 201.

For control of the seeker switch 16 either the record key 201 or the read key 202 feeds ground potential through break contact *a* of relay 205 and a back contact of connect relay 22 and thence through conductor 3 in cable 401 to break contact *a* on relay C0 (Fig. 4). This circuit then leads to break contact and winding on motor magnet SKR of the seeker switch 16 to battery and ground. The seeker switch immediately steps by means of self-interrupted pulses from whatever position at which it stood to a position corresponding to the operating keyset. At that position wiper 403 connects the relay C0 to ground through conductor 2 in cable 401 and thence to a contact of relay 22, contact *b* of relay 205 and thence to ground on key 201. The stepping of the seeker switch 16 is thus interrupted and the closure of contact *b* on the relay C0 completes a circuit for operating relay 22. This circuit may be traced as follows: from ground on contact *a* of relay S0 through contacts *a* of relays CS and CD, contact *b* of relay MK, make contact *b* of relay C0, wiper 404 of the seeker switch 16, conductor 1 of cable 401 and through the winding of relay 22 to battery.

Relay 22 is then operated and locked up by locking circuit 209 leading to contact *c* of relay 205 and thence to one of the ground contacts on key 201, or key 202. A normally closed contact *d* on relay 205 feeds ground potential through conductor 4 in cable 401 as soon as relay 22 has operated. This conductor leads to the winding of relay MK which is thereupon operated. This same conductor 4 is also connected through contacts *b* of relays CD and CS, both of which must be operated, as will presently be shown, in order to obtain a valid recording of a new item at a selected point on one of the discs. If an erroneous attempt were to be made to select a proper disc and a proper point thereon for recording a new item, then only one, or neither of the relays CD and CS will be operated, in which case relay S0 will operate after a certain time delay which is produced by a time constant circuit consisting of a capacitor 406 in shunt with the winding of relay S0. Relay S0 therefore operates slowly and upon closure of its contact *b*, the condenser 406 discharges.

Closure of contact *c* on relay S0 transmits ground potential through conductor 6 on cable 401 to relay 208 and also to the error indicating lamp ERR. Relay 208 locks up to hold the lamp lit, ground potential being fed thereto through conductor 210 from the operated key lever 201 or 202 and through locking contact of relay 208. Relay winding 205*y* is also energized, thus releasing relays MK and S0 to restore the common equipment to normal.

Assuming that a valid section of date and item number had been made at an operated keyset, I shall now show how the common equipment responds to the selecting signals and prevents the operation of relay SO.

Relays 408 are operated permutationally under control of the U-Date keys. Circuits from different contacts of these keys to the relay windings run through conductors 4, 5, 6 and 7 in cables 211 and 212. The pyramidal arrangement of the relay contacts is well known. It serves to translate the code set up by the keyset keys and the connected relays into the decimal system. The apex of the pyramid is grounded at contact *c* of relay MK when this relay operates. The ten output circuits, cable 417, lead through parallel branches to individual contacts of relays 409, which operate singly according to the selection of one of the T-Date keys.

Relay $409_0$ is automatically energized by closure of its operating circuit at contact *d* of relay MK whenever the O-key in the T-Date strip is depressed, despite the fact that this key has no circuit connections. It merely releases any other key in the same strip so that the first three of the relays 409, representing tens digits 1, 2 and 3 remain idle. Note the three break contacts *a* on these relays which are series connected in the circuit of relay 409o.

At any one time one only of the conductors in cable 417 is grounded by relays MK and 408. Therefore the operation of a single relay 409 provides an extension of the grounded conductor into one of three or four branches each corresponding to a different tens-figure (but the same units-figure), thus giving a date representation. Hence one of 31 date relays D1 to D31 inclusive may be selected. These relays have their windings individually connected to separate conductors in cable 418. Two of these relays D1 and D2 are shown in Fig. 5, relays D3 to D31 inclusive being indicated by a block. Each of these relays has six make contacts for connecting the windings of associated read-record heads 36 through cable 513 to three electronic reading circuits (Figs. 3 and 5) and through cable 514 to three electronic recording circuits as shown in Fig. 3. Each of the date relays has a make contact *a* for grounding conductor 3 in cable 402, thereby to operate relay CD which has a monitoring function to be explained later.

The key-strips H, T and U for item selection have their contacts arranged like those of the key-strip U-Date. Accordingly these key-strips provide for the permutational control of relays 410, 411 and 412 which, as a group, operate to translate 4-unit code into a decimally ordered number. Twelve conductors 8 to 19 inclusive in cables 211 and 212, and contacts of relay 22 make individual connections to the windings of twelve First Stage Item Selector relays, four of these relays being included in each of the blocks 410, 411 and 412.

There is a pyramidal arrangement of contacts operated by four relays in each of the groups 410, 411 and 412. Their apexes are all fed with ground potential at contact *c* of relay MK when this relay is operated. The connections through contacts of each pyramid are the same as shown for relays 408. The hundreds digit of the item number is decoded by relays 410, giving an activated output circuit which selects one of ten relays of the Second Stage Item Selector group, 413, 414 to be energized. Relays 413, 414 each have ten pairs of make contacts. The tens-digit of the item number is found by the operation of relays 411 whose pyramid delivers ground potential through a single conductor in cable 419 to one contact in each of the relays 413, 414.

Cable 420 contains 100 conductors, since each of the ten relays 413, 414 has ten output circuits. The 100 conductors are individually connected to the windings of 100 relays 415, 416 of a Third Stage Item Selector group. Each of these relays, like relay 413 has ten pairs of make contacts. Ground potential is delivered to one contact in the ten by virtue of the decoding operation of relays 412 which find the units digit of the item number and activate a single conductor in cable 421.

The Third Stage Item Selector relay group has 1000 output circuits (cable 422) which are individually connected to that many jacks in the jack-and-plug board 21. The board 21 will have as many cord-and-plug output conductors as there are positions available for item storage around any of the magnetic recording discs, 1, 2, 3 . . . 31. Assuming that there are fifty such positions, then the thirty one discs will have a storage capacity of 1550 items.

From the immediately preceding paragraphs it will be understood that the relay equipment shown in Fig. 4 is capable of responding to operation of any one of the keysets for selecting a disc and an item number. Such a selection may be made either for reading a previously stored item or for recording a new item. In the latter case energizing potentials are applied to each of the three recording windings of recording heads which are associated with a selected disc. The polarity of each magnetization pulse is, however, determined by the code combination representing the number to be recorded, as per operation of a key in group 203. So by this recording process the erasure of a previous record becomes automatic, especially since the magnetic flux produced by the recording pulse can be built up to the value of saturation.

From the jack-and-plug board 21 circuits through cable 423 are extended to separate contacts 536 of a bank in a rotary finder switch 20 (Fig. 5). This switch is stepped by means of self-interrupted pulses over a circuit from grounded contact *a* on relay MK, through conductor 1 in cable 402, break contact *a* of relay 503, interrupter contacts of the stepping magnet 502 and through the winding of this magnet to battery.

When wiper *a* on switch 20 reaches the contact 536 which was grounded by the item selection process, relay 503, in circuit with this wiper, is operated and opens the stepping circuit for magnet 502. Relay 503, upon operation, closes one of its make contacts *b* to feed a positive potential, say 180 volts, to wiper *b* on the finder switch 20 and thence to a selected segment 8 on the face plate of distributor 7. When brush 6 sweeps over that segment, a timing pulse will be obtained which will serve to gate the action of either a recording or a reading circuit, depending upon which of the lever keys 201 or 202 was operated.

*Electronic circuit for recording*

I shall now describe the electronic circuit for recording a new item. This circuit is shown in Fig. 3. It comprises relays 320, 321 and 322 on which the new item is stored in binary cody by setting one of the keys 203. Each of these relays has a pair of make contacts *a* and a pair of break contacts *b*. Closure of the *a* contacts feeds a −160 volt potential in respect to ground through conductors 1B, 2B and 3B, respectively, in cable 323 to control grids of tubes 309. Similar tubes are included in the blocks 318 and 319. The break contacts *b* normally supply a positive potential of, say, 20 volts with respect to ground to the control grids of tube 308 and similar tubes in the blocks 318 and 319. Connections to these control grids are made through conductors 1A, 2A and 3A in cable 323.

Tubes 308 and 309 are preferably of the tetrode type. Their screen grids are connected to a gating circuit which may be traced from the +180 volt source terminal, Fig. 5, through the contact *b* of operated relay 503, wiper *b* of switch 20, and a conductor 1 to 50 to a selected contact 8 on the distributor shown in Fig. 5, through brush 6 and conductor 516, through contact *b* on relay 302 and thence to the screen grid of tube 308 and of similar tubes in units 318 and 319. This gating circuit is further extended to screen grids of tube 309 and similar tubes, as will now be explained.

The anode of tube 309 is grounded and its cathode is connected through a cathode resistor 315 to a −180 volt source terminal. A voltage divider consisting of resistors 316 and 317 is connected between conductor 324 and said −180 volt source terminal. The values of resistors 316 and 317 are so chosen as to impress a triggering potential on the screen grid of tube 309 which is substantially equal to ground potential while the anode of this tube is directly grounded.

Tubes 308 and 309 are series-connected between −180 v. and +180 v. source terminals, while the cathode of tube 308 and the anode of tube 309 are grounded. An anode resistor 325 leads to the +180 volt source terminal. Two capacitors 310 and 311 are respectively connected across the space paths of the two tubes 308 and 309. The interconnection between these capacitors is connected to ground through a resistor 314 and is also connected through conductor 4 in cable 514 to one of the recording head windings 36 (Fig. 5). Similar connections are made, of course, to the other recording heads 36 from the units 318 and 319. The control grid of tube 308 is provided with a bias resistor 312 connected to a source of potential which may be −40 volts. A similar bias resistor 313 connects the control grid of tube 309 to a negative potential source, −220 volts.

With the tubes 308 and 309 connected as shown and having their electrodes supplied with the potentials indicated, it will be seen that these tubes are normally blocked, and that capacitors 310 and 311 will be charged. One or the other of these capacitors may, however, be suddenly discharged through the associated tube by raising the control grid and screen grid potentials to values which will permit a saturated current flow through the space path.

A marking pulse is applied to the recording head 36 by producing a conductive state in tube 309, thereby to discharge capacitor 311. This effect results from the operation of relay 320 and from the application of a positive gating pulse to the screen grid of the tube, this pulse being timed by the passage of brush 6 over an activated segment 8 of distributor 7. Tube 308 will at this time be biased more negatively than normal, due to the removal of the +20 v. potential from its control grid when contact *b* of relay 320 is opened. Hence tube 308 will not respond to the gating pulse applied to its screen grid.

When relay 320 is not operated, and the gating pulse is applied to the screen grid of tube 308, this tube becomes conductive because the normal closure of contact *b* on relay 320 holds the control grid potential at a value more positive than the grounded cathode. But at this time contact *a* on relay 320 is open-circuited and the control grid of tube 309 is maintained at a bias potential of substantially −220 volts, which is well below cut-off. So tubes 308 and 309 respond only one at a time and selectively to the gating pulse, even though the latter is applied simultaneously to the screen grids of these tubes.

Each of the capacitors 310 and 311 receives a charge before the gating action takes place. The junction point between these capacitors is normally maintained at substantially ground potential since it is grounded both through the recording winding of the recording head and through resistor 314. Upon application of the gating pulse capacitor 310 or capacitor 311 discharges through the associated tube. The discharge current will be divided, a small part of it going through resistor 314 to ground but the greater part of it going through the winding of the recording head, this winding being of considerably lower resistance than that of resistor 314. The direction of current flow through the winding of the recording head 36 depends upon the selection of capacitor 310 or capacitor 311 to be discharged. The duration of the recording pulse is sufficiently clipped so that the magnetization of a spot on the disc is of very limited area. Hence a relatively large number of recording positions may be provided around each disc. The surge impulses to the recording heads are carried through conductors 4, 5 and 6 in cable 514. Each of the digits of the binary code used in recording a number is represented as a spot of magnetization having north or south polarity, depending upon the operation of relay 320, 321 or 322.

*The electronic reading circuits*

A typical circuit is shown in Fig. 5 for one digit $2^0$ of the binary number to be read. The other two circuits for a 3-digit binary number are indicated in Fig. 3 by blocks 306 and 307, representing the digits $2^1$ and $2^2$. It will be recalled that when a reading is wanted the setting of the key-lever 202 on the keyset causes relay 301 to be operated. So the gating circuit through conductor 516 is now extended through contact *b* of relay 301 to conductor 326 and thence through resistors 517 and 518 to a suitable negative biasing source terminal −C. The junction between resistors 517 and 518 is connected to a control grid in a gaseous discharge tube 512. This tube is arranged to be ignited only by the additive effects of two control voltages simultaneously applied to its grid. The reading head 36 supplies one of these voltages to the electronic reading circuit and thence through capacitor 519 and resistor 520 to the grid of tube 512. The gating circuit supplies the other of the control voltages at the instant when brush 6 wipes over an activated segment 8 of the distributor.

Electron tubes 508 and 511 in the reading circuit are preferably of the twin triode type, although one of certain other types might be substituted in at least one of the stages. The space paths of the twin triode tubes have been labelled A, B, C and D for convenience of reference. The circuit parameters of these tubes are so chosen that they will operate in the well known flip-flop fashion, that is, where a conductive state in one triode section causes the other triode section of the same tube to be driven non-conductive and vice versa.

The pick-up winding in each of the reading heads 36 is grounded at one terminal and the other terminal is connected through one of the conductors 1, 2 and 3 in cable 513 to the primary winding of a transformer such as 507, a terminal of this primary being grounded. When a magnetized spot on the disc is scanned by the reading head, the pulse generated in the reading circuit is substantially equivalent to a single cycle of a sine wave. The storage of a marking signal element produces such a one-cycle wave with respect to which an inverted one-cycle wave is produced by a spacing signal element as stored.

The secondary winding of transformer 507 has a grounded mid-tap. Its terminals are interconnected through a resistor 521. Said terminals are also respectively coupled across capacitors 509 and 510 to the control grids in sections A and B of the twin triode discharge tube 508.

Section A in tube 508 is normally biased to cut-off by means of a biasing source terminal —C connected through a resistor 523 to the control grid of said section A. Resistor 524 connects the grid in section B to ground. The first semi-cycle of a mark pulse flows through capacitor 509 in a direction and of suitable magnitude to over-come the negative bias applied to the grid of section A. The second semi-cycle of the mark pulse restores section A to its normally blocked state.

When a stored spot of magnetization of spacing significance is scanned by the reading head 36, the resulting full-wave pulse generated in the reading circuit has no effect upon the tube 508 until the second semi-cycle thereof occurs. Tube 511 is arranged to operate as a slave to tube 508. It amplifies the output from section A and maintains the square wave characteristic thereof. The grids of both sections, C and D, are negatively biased by connecting the same through resistors 525 to the —C source terminal. Tube 511 has its parameters suitably adjusted to maintain one or the other of two stable states, and to shift from one to the other of these states only in response to control by the rise and fall of potential at the anode of section A in tube 508. This control potential is applied through capacitor 522 to the grid of section C in tube 511.

The anode in section C of tube 511 is coupled through capacitor 519 and resistor 520 to the control grid in the gaseous discharge tube 512. As previously pointed out, this tube will respond to only one of a train of pulses delivered by the rise and fall of anode potential in section C of tube 511, that one pulse being of necessity the one which is in synchronism with the gating pulse received from the brush 6 when it wipes over an activated distributor segment 8. Only when the item to be read is of marking significance will the anode of section C, tube 511 deliver a positive pulse to the grid of tube 512 in time to produce ignition.

Fig. 8 shows graphically how the pulses generated by any one of the reading heads are translated into control effects upon tube 512 when they read marks, and how the pulses are rendered ineffective when they read spaces. Any instant of time may be represented by a vertical line drawn through the several graphs.

The passage of brush 6 over segments 8 is shown on line 81. A series of magnetized spots as recorded on a disc is shown on line 82. Marks are represented as hills, spaces are represented as valleys. This is merely symbolic of north and south polarization of the spots with reference to a given axis.

Line 83 represents a wave generated by one of the reading heads. The wave shape is shown as somewhat of a distortion of a true sine wave which would in practice result from scanning magnetized spots of appreciable area. The smaller the spots, the closer the approach of the generated wave to a sine wave, provided the pole pieces of the pick-up head are also sharply pointed. Note, however, that the positive peaks generated by mark representing spots occur during the passage of brush 6 over a segment 8, while positive peaks generated by space representing spots occur after the brush 6 has left a segment 8.

Line 84 shows the conductive and non-conductive states of tube section A (tube 508) which reflect the reading of mark and space records as shown on line 83. A corresponding showing in reverse is made for tube section C (tube 511), as on line 85.

Line 86 shows how the grid of tube 512 receives an ignition voltage when the blocking of tube section C is concurrent with a gating pulse. The voltage peaks 87 in such cases are sufficiently high to overcome the blocking bias potential that is applied to the grid from —C source terminal through resistor 518. In the case of reading space representing spots the lack of coincidence between the gating pulse 88 and the reading pulse 89 results in a failure of either of these pulses to raise the grid in tube 512 to an ignition level.

In practice it would not be feasible or desirable to read successive magnetization spots along one path during a given revolution of the disc, unless the components of my system were to be modified in certain particulars. So it should not be inferred from the showing of Fig. 8 that a gating pulse would be obtained from more than one of the segments 8 along line 81 after setting the keys of a keyset to read a particular item. Hence Fig. 8 should be viewed as though the recordings along graph 82 were made individually at different times, while the wave shown along graph 83 would be reproduced as a continuous wave so long as one of the disc-selecting relays D1 to D31 is held operative. Yet only one of the mark-representing spots of magnetization could be effectively utilized at any one time to control tube 512 and cause it to be ignited, since the item selector 33 (Fig. 1) would allow only one of the segments 8 to be activated for delivering a gating pulse.

Referring again to Figs. 3 and 5, it will now be clear that each of the code translator relays 303, 304 and 305 will operate at the time of igniting one of the tubes 512, with the cathode of which its winding is connected. These relays have a common ground connection through make contact *d* of relay 301. They will, therefore, be released and the tubes 512 will be extinguished upon release of relay 301, as when relay 22 is released following the chain of relay releases at the time of freeing the common equipment from control by an operated keyset.

The contacts of relays 303, 304 and 305 are interconnected in pyramidal formation so that different permutational settings of these relays will serve to translate a binary number into a decimally ordered number. Since the range of numbers is from 0 to 7 in the illustrative embodiment shown, there are eight output circuits at the base of the pyramid. The apex of the pyramid is connected to ground through contact *c* of relay 301, conductor 506 and contact *a* of relay 501. This circuit is not completed, therefore, until relay 501 operates. Timing of the circuit closure is determined by the ignition of gaseous tube 504 whose space path is in series with the winding of relay 501. The tube is ignited by a surge impulse through capacitor 526 and through resistor 527 to the biasing source terminal —C, and this action takes place when brush 6 passes over the activated segment 8 of the distributor, thereby to feed a positive potential to conductor 516 to which one electrode of capacitor 526 is connected. By this arrangement relay 501 and selected ones of the relays 303, 304 and 305 will be operated substantially concurrently and false indications at the lamp bank L0—L7 will be avoided.

The output circuits at the base of the pyramid are connected through cable 213 and through contacts 0 to 7 inclusive in relay 22 to individual circuits in cable 214 to lamps L0 to L7 inclusive and in parallel therewith the locking relays LR0—LR7 inclusive. Each of these relays has a locking circuit connected to conductor 210 and to one of the contacts on each of the keys 201 and 202. Immediately upon applying pulses to the lamps and their associated locking relays, as already described, the common equipment will be freed from the operated keyset by a succession of releasing steps as follows:

Upon operation of relay 501 ground potential is applied at its contact *b* to conductor 2 in cable 402, which is connected to the winding of relay CS (Fig. 4) and causes this relay to operate. Relays CS and CD have previously been referred to as jointly operative to effect the lighting of lamp CHK when a valid selection of item and date has been made, and, in case only one or neither of the relays CS and CD operates, to effect the operation of relay SO and thereby to cause the error indicating lamp ERR to be lit. Contacts *b* of relays CD and CS (when both relays operate) interconnect conductors 4 and 5 in cable 401. These conductors lead through contacts of relay 22 to conductors through which ground potential is applied (as at break contact *d* of relay 205) at one end of the circuit, while three parallel branches at the other end are connected to battery through (1) relay 207, (2) lamp CHK, and (3) coil *x* in relay 205.

The locking contact on relay 207 supplies ground potential from key 202 (or key 201) in place of the ground at break contact *d* of relay 205. The three parallel branches from conductor 206 now remain closed circuits independently of the interconnection between conductors 4 and 5 in cable 401. Therefore the common equipment can be released without extinguishing the lamps.

When relay 205 operates, as above described, its break contact *a* removes ground potential from conductor 3 in cable 401 leading to the stepping magnet SKR of the seeker switch 16. Break contact *b* of relay 205 removes ground potential from conductor 2 in cable 401, leading to relay CO, which relay upon release opens the operate circuit for relay MK. Release of relay MK restores all selecting relays of the common equipment to normal. Break contact *c* of relay 205 opens the locking circuit through conductor 209 to relay 22, which relay upon release causes relay 301 (or relay 302) to release. Translator relays 303, 304 and 305 in series with associated gas discharge tubes are now de-energized. The common equipment, having now been completely restored to normal is available for seizure by any other keyset which may be awaiting its turn. Incidentally, however, the seeker switch 16 was not required to be held at the position of a currently operating keyset after performing its function of operating relay 22. An overlap of operations is provided by the connections of conductors 2 and 3 of cable 401 through break contacts of relay 22. So the seeker switch 16 is freed to step to another keyset position while relay 22 of the first keyset is locked up, provided one of the keys 201 or 202 of a second keyset is operated. But, if a second keyset does cause repositioning of the seeker switch 16, the relay 22 of the second keyset cannot be operated to cause garbling in the common equipment, since that relay would have its energizing circuit held open at contact *b* of relay MK until the latter is released by operation of relay 205 on the first keysets, as above explained.

The lamp indication made at the operated keyset can be retained at the operator's discretion until the start key 201 or 202 is restored to normal. When this is done it opens the locking circuit through conductor 210 to the locking relays LR0—LR7, 207 and 208, thus releasing the operated relays and extinguishing their associated lamps.

*Line signal control equipment*

As heretofore pointed out, I have arranged for the operation of the common equipment under control of transient storage facilities, which in turn are rendered responsive to incoming line signals. Either a Read signal "Q," or a Record signal "R" may be received over a two-way teleprinter line, for example, and an answer back signal may be automatically transmitted over the same line to verify the item newly recorded or to supply the wanted information in response to a reading request signal. The circuit diagram for use under line signal control is chiefly comprehended in Figs. 6 and 7.

In order not to limit the line circuit to messages which apply only to the storage system, ordinary message traffic may be handled without disturbing the common equipment for data storage. So each message which is to be routed to the data storage system is prefaced by the signals for Fig. Shift and £. These signals are preferably 5-unit code, and in the circuit arrangement as shown for handling data storage messages the use of 5-unit code is assumed, although not essential.

The line 14 is connected to a start-stop transmitting distributor 28, a start-stop receiving distributor 29 and a monitor printer 30. The distributors are of a well-known type wherein the five code elements of a character signal are directed into individual conductors. Each 5-unit code combination is translated upon reception by means of one or another of a plurality of relay groups, a different group being provided for the transient storage of each character in the message. For illustrative purposes in describing the operation, let it now be assumed that the message is as follows: (F)£30789(L)Q.

The parenthetically enclosed symbols represent Figure-shift, and Letter-shift signals respectively. The symbol £ is an uppercase character and here, as in teleprinter operation, it must be preceded by the Fig.-shift signal. The reception of these two signals successively causes an on-off switch 31 to close for directing the significant part of the message into the aforementioned translating relay groups. Following the reception of the message signals is a letter shift character which restores the on-off switch 31 to normal. However, provision is made for utilizing one of two code signals corresponding to the letters Q and R immediately following the letter shift signal.

The on-off switch unit 31 (Fig. 6) comprises five decoding relays 61 to 65 inclusive and two other relays 66 and 67. Relays 61 to 65 inclusive have certain of their contacts arranged in an incomplete pyramid for the purpose of decoding the following signals:

| | 1 | 2 | 3 | 4 | 5 |
|---|---|---|---|---|---|
| Fig. | X | X | | X | X |
| £ | | | X | | X |
| Let. | X | X | X | X | X |

Contacts *a* on the same relays are locking contacts all of which have a momentarily openable ground connection through conductor 7 in cable 68 and through contact *w* which is cam-operated by the receiving distributor at a suitable phase of its start-stop cycle. Cam-operation of contact *v* produces a momentary circuit closure for grounding conductor 6 in cable 68 immediately preceding the opening of contact *w*. This conductor 6 is a common connection to make contacts *b* on each of the relays 61 to 65 inclusive, so that upon operation of at least one of these relays ground potential is momentarily extended to conductor 69.

The code signal for Fig.-Shift causes relays 61, 62, 64 and 65 to be locked up. Coil *t* on relay 66 is then energized and its armature extends battery potential to the winding of relay 67. Relay 66 is of the conventional interlocking type wherein coil *t* moves the armature downward and coil *u* moves it upward. The armature is locked in one of these positions when one coil is energized and its position is shifted only by energizing the other coil.

The code signal for the symbol £ causes relays 63 and 65 to be locked up, thus completing the energizing circuit for relay 67. Thereafter, the reception of message code signals of numerical significance is accompanied by pulses applied through conductor 69, contact *a* of relay 67 and conductor 601 to the stepping magnet 602. Relay 67 is locked up through its locking contact *b* and is unlocked upon reception of the letter-shift code signal, that is, when all of the relays 61 to 65 inclusive operate to cause energization of coil *u* on relay 66.

In the signal train which follows £ there are five or six characters of numerical significance. The first two are for date selection; the next three are for item selection. A sixth character represents a one-digit number to be recorded, but in place of this a space signal occurs when the message calls for a reading.

The rotary switch 27 as herein shown has a contact bank and wiper associated with the stepping magnet, five banks for distributing code signals to different decoding relay groups, and a seventh bank for controlling a gang relay 603 whereby the code signal wipers of switch 27 are transferred from connections with the receiving distributor to corresponding connections with the transmitting distributor. Each bank has twenty stationary contacts. Their respective positions are shown in Fig. 6 by development of the circular paths of the wipers. Reading upwards, in the direction of wiper travel, these positions are used as follows:

| | Position | Function |
|---|---|---|
| Reception | 1 | Start (£). |
| | 2, 3 | Date selection. |
| | 4-6 | Item selection. |
| | 7 | Number to be recorded or space. |
| | 8 | Letter shift. |
| | 9 | "Q" or "R" signal. |
| Transmission | 10 | Figure shift. |
| | 11, 12 | Date identification. |
| | 13 | Space. |
| | 14-16 | Item identification. |
| | 17 | Space. |
| | 18 | Number read or recorded. |
| | 19 | Letter shift. |
| | 20 | Check (C) or Error (E). |

The received character code signals to which relays 61—65 respond are at the same time directed through cable 604 and back contacts of unoperated relay 603 to the wipers of switch 27, but they have no effect until these wipers have stepped off of the start position #1; that is, after reception of symbol £. Then comes the code signal for the tens-digit of the date. It is applied at switch position # 2 to conductors 1—5 in cable 606 and operates decoding relays of group 607. The contact arrangement of this group is typical of other groups of decoding relays indicated by blocks 71 to 75 inclusive in Fig. 7. That is to say, each relay has a make contact *a* for use in transmitting a marking code element, as will be explained hereinafter. Each relay has a locking contact *b* connected to a normally grounded conductor 5 in cable 608. The unlocking function, to be explained later, is performed by the operation of either of two relays 609 and 610. And each of the relay groups 607 and 71 to 75 inclusive has a pyramidal arrangement of contacts whereby the numerical 5-unit code signals are translated into a decimal indication, as represented by activation of a single output circuit at the base of the pyramid.

The wipers on switch 27 are advanced step-by-step after reception of each 5-unit code signal of the message. The five conductors in cable 606 which terminate at position #3 of switch 27 are connected to different relay windings in group 71 where the units digit of the date is decoded. The signals representing a 3-digit item number are picked up at positions #4, #5 and #6 of switch 27 and carried through individual conductors in cable 606 to appropriate relay windings in groups 72, 73 and 74. Relays in group 75 are operated by circuits in cable 606 which terminate at position #7 of switch 27. This group decodes the number to be recorded if the message is for recording purposes. Otherwise, as in reception of a "Read" message a space signal is received at this point. The switch wipers are then stepped to position #8 where a letter shift signal is received, but is not required to be decoded except in the monitor printer 30. Yet the wipers must be advanced.

At position #9 of switch 27 the received code character is either a "Q" to designate a query—that is, a "Read" message; or an "R" to designate a "Record" message comprising a numerical item to be recorded. The contacts of five relays in group 76 are arranged to decode the signals for "Q" and "R" alternatively.

In relay groups 71 to 75 inclusive all ten output conductors at the base of each pyramid are extended to needed selecting relays. But only three output conductors lead away from the pyramid of relay group 607, these being sufficient for selecting one of the relays of group 409 to be operated for selecting the tens digit 1, 2 or 3 of the date. It was explained previously how relay 409o operates when the date is prior to the tenth of the month. The operation under line signal control is the same as under keyset control, but, if the common equipment happens to be busy when line signals are received, the transient storage equipment shown in Figs. 6 and 7 must obtain clearance to apply its controls to the common equipment. This is done by means of the seeker switch 16 (Fig. 4) and associated relays CO and MK, the same as has been described in reference to keyset control.

Assuming that a previously started operation of the seeker switch has been completed when the wipers of switch 27 reach position #10, the following process is carried out:

Grounded wiper 611 on switch 27 is of the bridging type so as to feed a continuous operating and holding potential through conductor 612 to relay 603 during the time of passage of this wiper over positions #10 to #20 inclusive. At position #10 relay 603 operates and transfers connections of the five code element wipers from the receiving distributor 29 to the transmitting distributor 28. Five other circuits are also grounded at this time by make contacts of relay 603. These circuits lead through conductors 1, 2 and 3 of cable 613 to separate break contacts of a cut-off relay 615, through conductor 4 in cable 614 to the apexes of all the pyramids in the decoding relay groups, and through conductor 5 in cable 614 to self-locking contacts for all the relays in said groups. Conductors 614—5 and 608—5 are interconnected.

Relay 616 corresponds functionally with relay 22 in Fig. 2. Likewise, relay 615 with its two windings $x$ and $y$ corresponds with relay 205. By operation of relay 603 ground potential is extended through conductors 3 in each of the cables 613, 617 and 618, (normally interconnected by contacts of relays 615 and 616) and thence to a junction point 424 with conductor 3 in cable 401. Under the conditions stated, self-interrupted pulses are applied to stepping magnet SKR of switch 16 (Fig. 4).

Ground potential is at the same time extended through conductors 2 in the normally interconnected cables 613, 617 and 618 to a bank contact of switch 16 which is eventually contacted by the wiper 403. Thus relay CO is operated to open the circuit of the stepping magnet SKR. Switch 16 now comes to rest with wiper 404 in position to establish the following operate circuit for relay 616: from ground at break contact $a$ of relay SO, through break contacts $a$ of relays CS, CD and MK, make contact $b$ of relay CO, wiper 404 and conductor 1 in cable 618 to the winding of relay 616 and ground.

Immediately upon operation of relay 616, an operate circuit for relay MK is completed as follows: from ground on a break contact of relay 615 through conductor 4 in cable 617, make contact of relay 616, conductor 4 in cable 618 to junction 425 with conductor 4 in cable 401 and thence to the winding of relay MK and battery. Ground potential is also branched from this circuit through contacts of relays CD and CS to the winding of the slow-to-operate relay SO, the operation and monitoring function of which is now the same as under keyset control.

Relay 616 upon operation also disconnects conductors 2 and 3 of cable 618 from corresponding conductors in cable 617, thus freeing the seeker switch 16 from further control. A locking circuit for relay 616 is provided through now grounded conductors 1 in cables 617 and 613. By closure of make contacts of relay 616 (shown to the right of its winding) connections are made from the base of the pyramid of relay group 607 through conductors 1, 2 and 3 of cable 619 to the windings of three relays in group 409. One of these relays is selected by the decoding relay group 607 whenever the tens digit of the date is "1," "2" or "3." If it is "0," then relay $409_0$ operates, as heretofore explained.

A permanently grounded make contact on relay 616 applies an operating potential through conductor 6 of cable 620 to a slave relay 77 which has many make contacts as represented by the block 78. The contacts of relays 616 and 77 may, if desired, be controlled by a single magnetic coil and armature, but these relays have been separately located in Figs. 6 and 7 merely to simplify the circuit diagram. It will be understood that the contact assembly 78, when operated by relay coil 77, makes individual connections between the conductors of cables terminating at the top and conductors of corresponding cables terminating at the bottom of the block 78.

The common equipment having now been seized by operation of relays 616 and 77, the next step in the process is to transfer the effects of the decoded message to the proper responsive devices.

When the gang relay contacts in block 78 are closed, ground potential at the apexes of each of the pyramids of relay groups 71 to 74 inclusive is extended through selected conductors in cable 79 to junctions with corresponding conductors in cables 417 (units digit of date), 426, 419 and 421, and thence to selecting relays by which the date and item number are identified. The operation of these relays is now carried out in the same manner as previously described under keyset control. This means that a disc selector relay is operated and that the finder switch 20 is set in motion to give effect to the date and item selection as called for by the received message as stored on the decoding relays of groups 607, and 71 to 74 inclusive.

It will be recalled that the operation now being described is based on the assumption that the received message calls for a reading and, therefore, is terminated by the letter "Q." The decoding of the 5-unit signal for "Q" by relays of group 76 causes relay 301 to operate over a circuit which may be traced from one of the grounded contacts of relay 603 through conductor 4 of cable 614, through series-connected contacts of relay group 76, through conductor Q and a pair of make contacts in block 78, through cable 701 across Figs. 5 and 3 to junction 326, and through conductor Q in cable 204 to the winding of relay 301 and battery.

Relay 301, upon operation, starts the reading process as heretofore described with reference to keyset control. It also performs another function. By grounding its make contact $a$, it feeds ground potential through conductor 8 in cable 702, to a connection in block 78, to conductor 8 in cable 703 and thence through break contacts of relay 704 and interrupter contacts of a stepping magnet 705 to the winding of this magnet and to battery. This magnet now starts to drive a rotary finder switch 26 from any previously set position to a new position which is determined by the functioning of the electronic reading circuits and relays 303, 304, 305, as previously described.

When the item of information has been located on one of the magnetic storage discs, as by searching for it with brush 6 on distributor 7 (referring to the early description), the electronic reading circuits (Figs. 5 and 3) are caused to function.

It will be recalled that a number stored on one of the discs in binary code is translated into a decimal number by means of relays 303, 304 and 305. Their pyramidal contact arrangement gives effect to the application of ground potential to one of the conductors in cable 213 leading off from the base of the pyramid and connected to corresponding conductors 0—7 in cables 702 and 703 which terminate at different stationary contacts in the contact bank furthest to the left on finder switch 26. As wiper $a$ of this finder switch advances to the grounded contact the stepping action is ended by the energization of relay 704 the break contact of which is in the operating circuit of the stepping magnet 705.

Grounded wipers $b$, $c$, $d$ and $e$ are mounted on the same shaft with wiper $a$ and are therefore so positioned as to compose a 5-unit code signal corresponding to the decimal number. Relay 706 operates whenever the Q-signal has been decoded by operation of relay group 76. Corresponding conductors 1 to 5 inclusive in cables 707 and 620 are interconnected. The code signal for the number that was read is then set up on contacts in the 18th position of rotary switch 27.

It was stated that the latter shift signal and the Q-signal were received and applied at positions #8 and #9 of switch 27. Stepping magnet 602 is pulsed from cam-contact $v$. The pulses are directed through conductor 69 and contact $a$ of relay 67 to the stationary contacts in bank A of rotary switch 27. When the letter shift signal appears it is decoded by relays 61—65, and the energization of coil $u$ on relay 66 causes relay 67 to release. Hence the wiper steps from positions #8 and #9 on switch 27 are made after relay 67 opens its contacts $a$. Therefore contacts in bank A at positions #8 and #9 are directly connected to conductor 69.

When the wipers of switch 27 reach position #10, they are at the proper starting point for collecting code signals to be transmitted as the reply message. Actual start of the transmission, however, is timed by the operation of one or the other of the two slow-acting relays 609 and 610. Relay 609 provides a check indication when the reading process is successfully carried out. Relay 610 operates in sequence to the operation of relay SO (Fig. 4) and thus indicates an Error. The operating circuits for relays 609 and 610 extend through conductors 5 and 6 in cable 623, through contacts of relay 616, through conductors 5 and 6 in cable 618 to junction points with conductors of the same numbers in cable 401 and thence respectively to the front contact of relay CS and the movable contact $c$ of relay SO. Windings $x$ and $y$ on relay 615 are also connected respectively to conductors 5 and 6 in cable 623. As previously stated, relay 615 operates in conformity with the operation of relay 205, that is, to disconnect and restore the common equipment after a reading (or recording) operation has been completed.

Referring again to relays 609 and 610, contact $a$ on each of these relays when closed applies ground potential through conductor 624 to the clutch magnet (not shown) in transmitting distributor 28. This starts the operation of transmitting a reply message, the code composition of which is now set up on the bank contacts in positions #10 to #20 inclusive of switch 27. The presence or absence of ground potential on these contacts determines the make-up of the mark-space signal train, the wipers of switch 27 serving in place of the conventional pecker-pins in a tape transmitter. Either of the relays 609, 610 when operated locks up during this transmission. Note that conductor 1 in cable 613 is extended from a make contact of relay 603 to contact $f$ of relay 609 and also to contact $d$ of relay 610, these being locking contacts.

Upon transmission of each character over the line 14 a cam-operated switch $a$ in the distributor 28 is operated and feeds a ground potential pulse over conductor 621 to interconnected contacts 10 to 20 inclusive in bank A of switch 27. So the transmission of the figure shift code signal and each subsequent character of the reply message is accomplished by moving the wipers of switch 27 over its positions 10 to 20 inclusive and by picking up the 5-unit code signals from contacts in banks B, C, D, E and F.

Contacts $a$ on relays of groups 607 are individually connected through conductors 1, 2, 3, 4 and 5 in cable 622 to contacts at position #11 in banks B, C, D, E and F of switch 27. Similar connections are made through other individual conductors in cable 622 so that all of the date and item selection data may be transmitted back to the distant station to identify the reading of the stored item. The tens and units figures of the date are picked up for answer-back transmission from positions #11 and #12 of switch 27. Position #13 has a grounded contact on bank D and thus causes a space signal to be transmitted. Positions #14, #15 and #16 are used to pick up the code signals for the item number as stored in relay groups 72, 73, 74. Position #17 is like #13 in that it causes a space signal to be transmitted.

At position #18 the information which was read from the magnetic storage disc, as previously described, is utilized. The signal is formed as a 5-unit telegraph character by means of the translator switch 26, wherein the wipers have been caused to stand at a position selected by operation of cut-off relay 704 when the wiper $a$ reaches a grounded contact. This operation was previously explained. The output circuits from certain bank contacts of this switch are contained in cable 707 leading to contacts of a gang relay 706 and through conductors in cable 620 to contacts at position 18 in switch 27. Relay 706 was held operated by the locking up of relays of group 76 in response to the reception of the "Q" signal. Break contact on relay 706 avoids interference from relays 75, as will be explained later.

At position #19 it is necessary to transmit a letter shift signal because the succeeding character is either a "Q" or an "R." So at position #19 the contacts in banks B, C, D, E and F are all grounded to compose a letter shift signal MMMMM, where M means mark. At position 20 the signal to be transmitted is either SMMMS, meaning "C" for "Check," or it is MSSSS, meaning "E" for "Error." In the first case ground potential is derived from contacts $b$, $c$ and $d$ on relay 609. In the second case contact $b$ on relay 610 supplies ground potential to the contact in bank B at position 20.

Now that the reply message has been transmitted, including the requested data that was obtained by reading the coded number from the magnetic storage device it is next in order to unlock all relays that were held operated up to this point. The procedure is as follows:

At the end of the reply message transmission the wipers of switch 27 step from position #20 to position #1. Relay 603 releases because wiper 611 has left the last of the contacts in bank G to which conductor 612 is connected. Ground potential is now removed from conductors 1, 2 and 3 in cable 613. This unlocks relay 609 or 610 but otherwise there is no concurrent effect since conductors 1, 2 and 3 were previously open-circuited by operation of relay 615. Conductor 4 in cable 614 is open-circuited when relay 603 releases and hence ground potential is removed from the apexes of all contact pyramids of the selecting relay groups.

Conductors 5 in cables 614 and 608 are interconnected and are grounded at different times from different points. During message reception ground potential is applied at contact c of relay 610 and is fed through contact e of relay 609 to said conductors and to the many locking contacts of the selecting relays. During reply message transmission these relays are held locked by ground potential applied to conductor 5 in cable 614 which terminates at a front contact of relay 603. This is required because the first mentioned grounding circuit is opened by one or the other of relays 609 and 610 at the start of the transmission, and the last mentioned relays must also be supplied with ground on their locking contacts until relay 603 releases.

Figure 7:
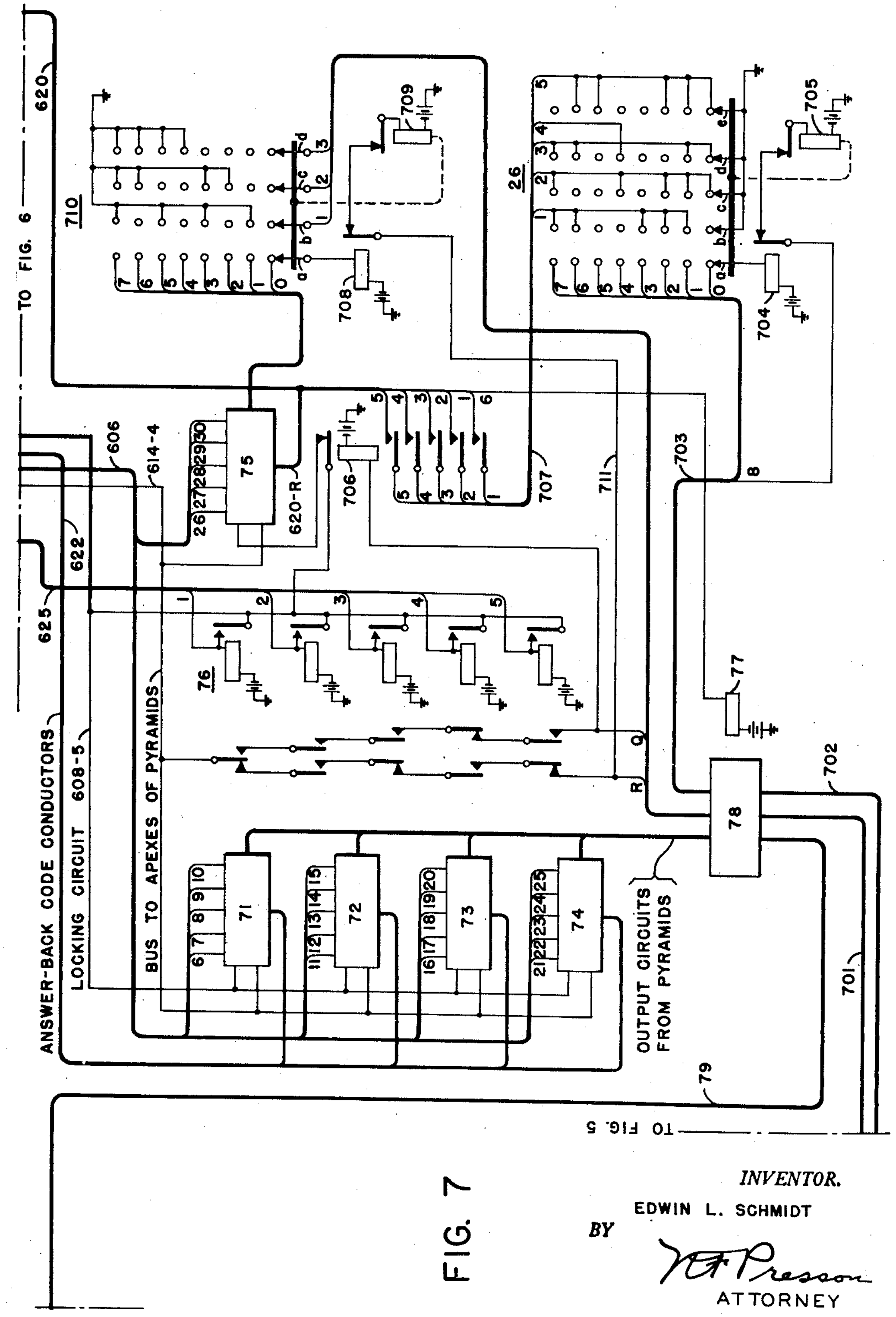

To continue with the releasing steps, the movable contacts of relay 603 to which the code wipers of switch 27 are connected are now returned to their initial position in readiness for the reception of a succeeding message as applied to conductors in cable 604. The release of relay 609 or 610, (whichever one was operated) causes the clutch circuit to distributor 28 to be opened. So the cyclic operation of the distributor ceases. Relay 706 releases upon opening its operating circuit through the translating contact chain of relays 76. The equipment as shown in Figs. 6 and 7 is, therefore, completely restored to normal by the releasing operations as hereinabove described.

*Line signal control for recording*

Many similarities will be found between the mode of operation of my system for obtaining a reading and for recording a new item under conditions of line signal control. The date and item selecting signals are decoded in the same manner. The code signal for a numerical item to be recorded is received at position #7 of switch 27 and is decoded by relay group 75.

At position #9 the "Record" signal "R" is received and is decoded by relays of group 76, connections being through cable 625. When relay 603 operates, ground potential is applied to conductor 4 in cable 614, and is fed through the left-hand chain of contacts of relays 76 to output terminal R and thence through break contacts of a cut-off relay 708 and interrupter contacts of stepping magnet 709 and to battery. This stepping magnet operates a finder switch 710 wherein wiper *a* seeks a grounded contact in the bank that it traverses. Ground is applied to that contact by virtue of the decoding of the numerical item signal in the relay group 75. This relay group, like other decoding relay groups, has the apex of its contact pyramid connected to conductor 614—4. The locking circuit for its relay windings is, however, taken from conductor 608—5 through a break contact of relay 706, the function of which is carried out only during the process of taking a reading.

To explain this matter further, it should be recalled that when a reading is to be made, the space signal SSMSS is applied at position #7 of switch 27. So one of the relays in group 75 becomes locked up and must be unlocked by operation of relay 706 before the signal as coded by switch 26 can be transmitted through cable 620. Otherwise the signal for the numerical item as read might be garbled. But, during the process of recording a new item and of verifying the same by an answer-back signal, the code signal that was received and decoded by relay group 75 is retained by the locking circuit until fed out again from the transmitting contacts of this group through cable 620R, the five conductors of which are individually connected to conductors 1 to 5 inclusive in cable 620.

Wipers *b*, *c* and *d* on the finder switch 710 come to rest at a position corresponding to the number to be recorded. The grounding of certain bank contacts causes the number to be translated into binary code. This code signal is thus prepared for utilization when relay 77 operates. Then conductors 1, 2 and 3 are connected through contacts in group 78 to correspondingly numbered conductors in cable 701 leading to junction point 326 and to the windings of relays 320, 321 and 322. These relays operate as explained in the description of the recording procedure under keyset control. The pulses representing the binary code for the number to be recorded are shot through cable 514 to the recording heads 36 at the instant when the electronic circuits for recording are gated by the passage of distributor brush 6 over the selected segment 8 of the itemselecting distributor 7 (Fig. 5).

The next step in the process is to transmit an answer-back signal over the line 14. Here the operations are very similar to those described in reference to the reply signal which follows a reading. Following a recording, however, relay 706 will be unenergized so that the code signal which represents the numerical value of the new item is that which was stored in relay group 75 and locked up therein at the time of reception of the record message.

In brief, the answer-back signal is composed of code combinations representing the date and item number, the recorded item itself, as applied through cable 620 to bank contacts of switch 27 at position #18, the latter shift signal at position #19, and finally the "C" or "E" character at position #20 to report that the orignal message was or was not obeyed.

The restoration of equipment to normal after transmitting the answer-back signal in this case is exactly the same as has been described in the chapter covering a reading operation.

In the foregoing description of my invention it has been deemed necessary to trace numerous circuits and to refer to many components which are comprised in a workable system. Modification of details in many respects is, however, assumed to be within the capabilities of those skilled in the art and could be made without departing from the spirit of the invention. It will be appreciated, therefore, that the particular embodiment herein shown and described is set forth merely by way of example.

I claim:

1. A system for magnetic storage of statistical items and for revealing said items selectively as wanted, said system comprising signal responsive means including devices for responding to incoming code signals of group identifying significance and devices subject to control by incoming code signals of character significance, a continuously rotatable member having a magnetizable surface along different paths of which electrical pulses may be magnetically recorded, a number of said paths serving to record respectively different elements of a permutational code signal, recording heads having magnetic pole pieces relative to which said member may be moved for spot magnetization along said paths in response to said pulses, gating means operable to apply said spot magnetization at predetermined positions along said paths, selecting means controlled by said identifying signals for instructing said gating means when to operate, and read-out devices operable in response to a request signal when accompanied by an identifying code signal, whereby the intelligence of any selected statistical item may be singly revealed and caused to be visually displayed.

2. A system for magnetic storage of statistical items, comprising a continuously rotatable member having magnetizable surfaces, a plurality of recording heads arranged and adapted to apply spot magnetization to said surfaces in response to the reception of signal pulses, means for selecting a particular group of said recording heads to be simultaneously activated, thereby to record a permutation signal of character significance, means for selecting a particular position lengthwise of a record track on said member whereat to render the activation of said recording heads effective, the basis of position selection being one which classifies said statistical items in a predetermined manner, timing means for controlling said position selecting means synchronously with the rotation of said rotatable member, means for selectively scanning different record tracks to ascertain the purport of statistical items stored therein, and means for so gating the operation of said scanning means that said statistical items currently stored shall be revealed only as wanted.

3. A system for magnetic storage of statistical items in classified order, comprising a continuously rotatable member, recording and pick-up devices past which the surfaces of said member are movable along certain recording tracks, said recording devices having electromagnetic means for applying spot-magnetization at selected points along said recording tracks, and said pick-up devices having electromagnetic means for detecting such points of spot-magnetization as selected, a two-way signaling system for establishing intercommunication between a first station and a second station, said rotatable member and devices being situated at said second station, selective means responsive to signals initiated at said first station and reecived at said second station for conditioning particular ones of said recording devices to operate, further selective means responsive to such signals for timing the operation of selected recording devices, synchronizing means for so coordinating the operation of the selective timing means and the rotation of said rotatable member as to determine the points of spot magnetization for recording any statistical item in accordance with the classification of a received signal which is to be recorded, and means operable in response to the reception of inquiry signals for activating selected ones of said pick-up devices at selected times, thereby to read-out said currently stored items only as wanted.

4. In a system of the class described, a continuously rotatable member having magnetizable record tracks, whereof different linear points are assignable to respectively different classes of statistical items to be recorded, certain of said tracks being grouped for the collective storage of the several mark and space code elements of a permutation code signal, a plurality of electromagnetic recording heads each suitably disposed with respect to a particular one of said tracks for spot magnetization thereof in response to the reception of a corresponding code element in such a signal, distributor means operable in synchronism with the rotation of said member, said distributor means being effective to allocate incoming signals to appropriate points linearly of said record tracks, and means operable in response to the reception of class identifying signals for determining selectively the times of operation of said recording heads so as to obtain coincidence between the effectiveness of said distributor means and the passing of an assigned linear point of each record track into position to be spot magnetized for storage of the given statistical item.

5. In a system of the class described, a continuously rotatable member having magnetizable record tracks whereon statistical items have been recorded, the position of each item along said tracks having been chosen according to a predetermined classification of such items, certain of said tracks being grouped for the collective storage of the several mark and space code elements of a permutation code signal, a plurality of reading heads each suitably disposed with respect to a particular one of said tracks for the pick-up of signals produced by the scanning of magnetization spots which constitutes the storage of said statistical items, a circuit gating device for timing the effectiveness of said reading heads so as to pick up a single code signal, and selector means operable in synchronism with the rotation of said member for so controlling said gating device that individual ones of said statistical items may be read out at will.

6. In a magnetic storage device for signal pulses, a continuously rotatable magnetic member, an electromagnetic head suitably disposed with respect to a surface of said member for producing spot magnetization thereon or for taking an individual spot reading therefrom, circuits separately operable through windings of said head for causing it to record or to read as required, selective means responsive to a signal for rendering a desired one of said circuits operable, and a gating device subject to control by received selecting signals for coordinating the instantaneous position of said member with a spot position selected for recording or reading.

7. The combination according to claim 6 and including a plurality of groups of recording and reading heads of the type defined in that claim, each group being arranged and adapted to respond to incoming permutation code signals or to detect the magnetic record of such signals as currently stored by previous spot magnetization of said continuously rotatable magnetic member, and means for activating a selected one of said groups of heads in accordance with a predetermined group classification of statistical data, where individual items of statistics of one group are assigned to respectively different positions along a given record track and items of other groups are similarly assigned to respectively different record tracks.

8. In a magnetic storage device for signal pulses, a continuously rotatable magnetic member, an electromagnetic head suitably disposed with respect to a surface of said member for producing spot magnetization thereon or for taking an individual spot reading therefrom, circuits separately operable through said head for causing it to record or to read as required, selective means responsive to a signal for rendering a desired one of said circuits operable, and a gating device subject to control by received selecting signals for coordinating the instantaneous position of said member with a spot position selected for recording or reading.

9. A system for storing and subsequently examining individual items of statistics, in which all currently stored items are differently identifiable according to a predetermined classification, said system comprising a plurality of electromagnetic recording and reading heads, a continuously rotatable member having a magnetizable surface with recording tracks thereon which move in the direction of rotation past respectively different ones of said recording and reading heads, said heads having controllable recording circuits and controlled reading circuits connected thereto, circuit means for selecting a group of said heads for simultaneous activation in accordance with a generic classification of items to be stored, circuit means for selecting a moment for activation of the selected heads in accordance with the specific identity of an item to be stored and in fixed relation of each specfic item class to the phase of rotation of said member, means including a source of permutation code signals for producing spots of polarized magnetization on said surface by activating said recording heads as selected and timed and in accordance with the mark and space elements of a received permutation code signal, and circuit means for subsequently activating a selected group of said reading heads and selectively timing its activation, thereby to reveal the significance of a single currently stored item as wanted.

10. A system for storing and subsequently manifesting individual items of statistics, each item being constituted as a code combination of mark and space units and all currently stored items being differently identifiable according to a predetermined classification, said system comprising a continuously rotatable member having a magnetizable surface, different recording tracks thereon which are movable past stationary positions of recording and reading, electromagnetic recording and reading heads having pole pieces at said recording and reading positions, a recording circuit for each of said recording heads, a reading circuit for each of said reading heads, means for operating said circuits selectively, a synchronizing device operable to maintain a predetermined phase relation between the rotation of said member and selected moments of activation of said heads, whereby an item of any particular class may be recorded or read by reference to an assigned storage position along the record track, gating means for activating a selected group of said recording heads to record in its proper place on the record track an item of any designated classification, and further gating means for activating a selected group of said reading heads to singly manifest the significance of a currently stored item as selected by its classification.

11. In a storage system for statistical items, a control unit for introducing such items into storage and for selecting stored items to be manifested, a continuously rotatable storage member having a magnetizable surface, a plurality of recording and reading heads each suitably disposed with respect to said surface for scanning prescribed record tracks thereon, means subject to control from said control unit for causing a selected portion of said surface to be spot-magnetized for storing a signal, the basis of selection being such that signals of like classification are stored in definitely assigned places along said tracks and along different tracks or groups of tracks according to their identity, selecting means operable from said control unit and in accordance with the timing of operation of at least one reading head so as to detect the moment of passage of a desired item record into reading position, and means for causing the significance of a stored item when reported by any of said reading heads to be visually manifested.

12. The combination according to claim 11 and including other control units of the type therein defined, and a seeker switch operable from any one of the control units to seize control of the storage system while locking out such control by the remaining control units.

13. The combination according to claim 11 wherein said control unit comprises a code signal translator arranged and adapted to convert code signals as used in a communication system into other code signals more suitable for magnetic storage and vice versa.

14. The combination according to claim 11 and including an error detector operable whenever the control unit is so operated as to fail of selecting a usable portion of said magnetizable surface whereat to record or to read a statistical item.

15. In a device of the class described, a continuously rotatable member having at least one magnetizable surface, at least one group of recording heads suitably disposed with respect to said surface for producing spot magnetization thereon in response to applied code signals, at least one group of reading heads suitably disposed with respect to said surface for deriving information as to the storage of statistical items thereon, finder means for locating a predetermined portion of said surface whereon to record the mark and space elements of a code signal which pertains to a statistical item of particular class, and means for activating a selected group of said reading heads at a particular moment when it scans a recorded code signal pertaining to a chosen class.

16. In a device of the class described, the combination of a plurality of magnetic storage discs continuously rotatable on a common shaft, a brush arm mounted on said shaft and carrying a brush, a distributor face plate having segments suitably disposed to be successively contacted by said brush, a group of heads operatively associated with each respective one of said discs for magnetically storing the code elements of received code signals, the same heads serving at times to read out the purport of stored code signals, selective means operable by virtue of the timing function of said brush and face plate to so activate a given group of heads that they record different statistical items on said discs in classified order, and further selective means for causing a given group of heads to read out any desired one of the stored statistical items.

17. A system for magnetic storage of a plurality of data respectively relating to different items of information, comprising a magnetic member having a plurality of magnetizable data storage portions respectively assignable to said different items of information, a magnetic recording and reading device adjacent to said magnetic storage member for selectively magnetizing any of said data storage portions for storing data thereon or alternatively for taking a reading of data previously stored thereon, means for transmitting signals including item selection signals to said storage apparatus, means for causing continuous relative movement between said magnetic storage member and said magnetic recording and reading device for continuously scanning said plurality of data storage portions, circuits separately operable through said magnetic recording and reading device for causing the device to record or read as desired, selective means responsive to certain of the received signals for rendering a desired one of said circuits operable, and a gating circuit whose timing is determined jointly by the received selection signals and a particular instantaneous position of said recording and reading device relative to that of a data storage portion selected, said first named circuits being controlled by said gating circuit for effecting a recording or reading operation.

18. A system for magnetic storage of a plurality of data respectively relating to different items of information, comprising a magnetic member having on a surface thereof a plurality of magnetizable data storage areas respectively assignable to said different items of information, a magnetic recording and reading device adjacent to the surface of said magnetic storage member for selectively magnetizing any of said data storage areas for storing data thereon or alternatively for taking a reading of data previously stored thereon, means for transmitting signals including item selection signals to said storage apparatus, means for causing continuous relative rotation between said magnetic storage member and said magnetic recording and reading device for continuously scanning said plurality of data storage areas, circuits separately operable through said magnetic recording and reading device for causing the device to record or read as desired, selective means responsive to certain of the received signals for rendering a desired one of said circuits operable, and means including a gating circuit whose timing is controlled by the received selection signals for coordinating a particular instantaneous position of said recording and reading device relative to that of a data storage area selected for recording or reading.

EDWIN L. SCHMIDT.

REFERENCES CITED

The following references are of record in the file of this patent:

UNITED STATES PATENTS

| Number | Name | Date |
|---|---|---|
| 2,224,244 | Hicks | Dec. 10, 1940 |
| 2,336,910 | Zenner | Dec. 14, 1943 |
| 2,360,296 | Willis | Oct. 10, 1944 |
| 2,416,445 | Jensen | Feb. 25, 1947 |
| 2,431,646 | Kenney | Nov. 25, 1947 |